US012374115B2

United States Patent
Duan et al.

(10) Patent No.: US 12,374,115 B2
(45) Date of Patent: Jul. 29, 2025

(54) SYSTEMS AND METHODS OF USING CACHED IMAGES TO DETERMINE PRODUCT COUNTS ON PRODUCT STORAGE STRUCTURES OF A PRODUCT STORAGE FACILITY

(71) Applicant: Walmart Apollo, LLC, Bentonville, AR (US)

(72) Inventors: Zhaoliang Duan, Frisco, TX (US); Benjamin R. Ellison, San Francisco, CA (US); Lingfeng Zhang, Dallas, TX (US); Avinash M. Jade, Bangalore (IN); Raghava Balusu, Achanta (IN); Mingquan Yuan, Flower Mound, TX (US); Zhichun Xiao, Plano, TX (US)

(73) Assignee: Walmart Apollo, LLC, Bentonville, AR (US)

( * ) Notice: Subject to any disclaimer, the term of this patent is extended or adjusted under 35 U.S.C. 154(b) by 374 days.

(21) Appl. No.: 18/158,969

(22) Filed: Jan. 24, 2023

(65) Prior Publication Data

US 2024/0249524 A1 Jul. 25, 2024

(51) Int. Cl.
*G06F 16/51* (2019.01)
*G06F 16/538* (2019.01)
(Continued)

(52) U.S. Cl.
CPC .............. *G06V 20/50* (2022.01); *G06F 16/51* (2019.01); *G06F 16/538* (2019.01); *G06V 10/50* (2022.01);
(Continued)

(58) Field of Classification Search
None
See application file for complete search history.

(56) References Cited

U.S. PATENT DOCUMENTS

| 5,074,594 A | 12/1991 | Laganowski |
| 6,570,492 B1 | 5/2003 | Peratoner |

(Continued)

FOREIGN PATENT DOCUMENTS

| CN | 106347550 B | 8/2019 |
| CN | 110348439 B | 10/2019 |

(Continued)

OTHER PUBLICATIONS

Shane Thomas, PCT International Search Report, mailed Apr. 19, 2024, in connection with International Application No. PCT/US2024/12034, all pages.

(Continued)

*Primary Examiner* — Bernard Krasnic
(74) *Attorney, Agent, or Firm* — Foley IP Law, PLLC

(57) ABSTRACT

Systems and methods of detecting and recognizing products on product storage structures of a product storage facility include an image capture device that moves about and captures images of the product storage structures at the product storage facility. A computing device processes the obtained images to detect and identify the products on the product storage structure, crops each of the identified individual products from the image to generate a plurality of cropped images and generates an image histogram template, feature vector template and location information template for each of the cropped images. The cropped images are stored in an electronic database and represent a reference model for each of the identified individual products and are stored in association with the generated image histogram template, feature vector template and location information template to facilitate recognition of products subsequently captured on the product storage structure by the image capture device.

17 Claims, 14 Drawing Sheets

(51) Int. Cl.
  *G06V 10/50* (2022.01)
  *G06V 10/75* (2022.01)
  *G06V 20/50* (2022.01)
  *G06V 20/62* (2022.01)
  *G06Q 10/087* (2023.01)

(52) U.S. Cl.
  CPC ............ *G06V 10/751* (2022.01); *G06V 20/63* (2022.01); *G06Q 10/087* (2013.01)

(56) References Cited

U.S. PATENT DOCUMENTS

| | | |
|---|---|---|
| 8,923,650 B2 | 12/2014 | Wexler |
| 8,965,104 B1 | 2/2015 | Hickman |
| 9,275,308 B2 | 3/2016 | Szegedy |
| 9,477,955 B2 | 10/2016 | Goncalves |
| 9,526,127 B1 | 12/2016 | Taubman |
| 9,576,310 B2 | 2/2017 | Cancro |
| 9,659,204 B2 | 5/2017 | Wu |
| 9,785,898 B2 * | 10/2017 | Hofman ............... G06Q 10/087 |
| 9,811,754 B2 | 11/2017 | Schwartz |
| 10,002,344 B2 | 6/2018 | Wu |
| 10,019,803 B2 | 7/2018 | Venable |
| 10,032,072 B1 | 7/2018 | Tran |
| 10,129,524 B2 | 11/2018 | Ng |
| 10,210,432 B2 | 2/2019 | Pisoni |
| 10,373,116 B2 | 8/2019 | Medina |
| 10,572,757 B2 | 2/2020 | Graham |
| 10,592,854 B2 | 3/2020 | Schwartz |
| 10,748,030 B2 * | 8/2020 | Hari ....................... G06V 20/00 |
| 10,839,452 B1 | 11/2020 | Guo |
| 10,922,574 B1 | 2/2021 | Tariq |
| 10,943,278 B2 | 3/2021 | Benkreira |
| 10,956,711 B2 | 3/2021 | Adato |
| 10,990,950 B2 | 4/2021 | Garner |
| 10,991,036 B1 | 4/2021 | Bergstrom |
| 11,036,949 B2 | 6/2021 | Powell |
| 11,055,905 B2 | 7/2021 | Tagra |
| 11,087,272 B2 | 8/2021 | Skaff |
| 11,151,426 B2 | 10/2021 | Dutta |
| 11,163,805 B2 | 11/2021 | Arocho |
| 11,276,034 B2 | 3/2022 | Shah |
| 11,282,287 B2 | 3/2022 | Gausebeck |
| 11,295,163 B1 | 4/2022 | Schoner |
| 11,308,775 B1 | 4/2022 | Sinha |
| 11,409,977 B1 | 8/2022 | Glaser |
| 2005/0238465 A1 | 10/2005 | Razumov |
| 2011/0040427 A1 | 2/2011 | Ben-Tzvi |
| 2012/0243784 A1 * | 9/2012 | Fukuhara ............... H04N 19/34 382/168 |
| 2014/0002239 A1 | 1/2014 | Rayner |
| 2014/0247116 A1 | 9/2014 | Davidson |
| 2014/0307938 A1 | 10/2014 | Doi |
| 2015/0363625 A1 | 12/2015 | Wu et al. |
| 2015/0363660 A1 | 12/2015 | Vidal |
| 2016/0203525 A1 | 7/2016 | Hara |
| 2017/0106738 A1 | 4/2017 | Gillett |
| 2017/0286773 A1 | 10/2017 | Skaff |
| 2018/0005176 A1 | 1/2018 | Williams |
| 2018/0018788 A1 | 1/2018 | Olmstead |
| 2018/0197223 A1 | 7/2018 | Grossman |
| 2018/0260772 A1 | 9/2018 | Chaubard |
| 2019/0025849 A1 | 1/2019 | Dean |
| 2019/0043003 A1 | 2/2019 | Fisher |
| 2019/0050932 A1 | 2/2019 | Dey |
| 2019/0087772 A1 | 3/2019 | Medina |
| 2019/0163698 A1 | 5/2019 | Kwon |
| 2019/0197561 A1 | 6/2019 | Adato |
| 2019/0220482 A1 | 7/2019 | Crosby |
| 2019/0236531 A1 | 8/2019 | Adato |
| 2020/0118063 A1 | 4/2020 | Fu |
| 2020/0246977 A1 | 8/2020 | Swietojanski |
| 2020/0265494 A1 | 8/2020 | Glaser |
| 2020/0286032 A1 | 9/2020 | Bogolea et al. |
| 2020/0324976 A1 | 10/2020 | Diehr |
| 2020/0356813 A1 | 11/2020 | Sharma |
| 2020/0380226 A1 | 12/2020 | Rodriguez |
| 2020/0387858 A1 | 12/2020 | Hasan |
| 2021/0049541 A1 | 2/2021 | Gong |
| 2021/0049542 A1 | 2/2021 | Dalal |
| 2021/0142105 A1 | 5/2021 | Siskind |
| 2021/0150231 A1 | 5/2021 | Kehl |
| 2021/0192780 A1 | 6/2021 | Kulkarni |
| 2021/0216954 A1 | 7/2021 | Chaubard |
| 2021/0272269 A1 | 9/2021 | Suzuki |
| 2021/0319684 A1 | 10/2021 | Ma |
| 2021/0342914 A1 | 11/2021 | Dalal |
| 2021/0400195 A1 | 12/2021 | Adato |
| 2022/0043547 A1 | 2/2022 | Jahjah |
| 2022/0051179 A1 | 2/2022 | Savvides |
| 2022/0058425 A1 | 2/2022 | Savvides |
| 2022/0067085 A1 | 3/2022 | Nihas |
| 2022/0114403 A1 | 4/2022 | Shaw |
| 2022/0114647 A1 | 4/2022 | Bronicki et al. |
| 2022/0114821 A1 | 4/2022 | Arroyo |
| 2022/0138914 A1 | 5/2022 | Wang |
| 2022/0165074 A1 | 5/2022 | Srivastava |
| 2022/0222924 A1 | 7/2022 | Pan |
| 2022/0262008 A1 | 8/2022 | Kidd |
| 2024/0119408 A1 | 4/2024 | Chen et al. |
| 2024/0119409 A1 | 4/2024 | Balusu et al. |
| 2024/0119735 A1 | 4/2024 | Zhang et al. |
| 2024/0119749 A1 | 4/2024 | Zhang et al. |
| 2024/0127168 A1 | 4/2024 | Puviyarasu et al. |
| 2024/0135315 A1 | 4/2024 | Wang et al. |
| 2024/0152863 A1 | 5/2024 | Zhang et al. |
| 2024/0249239 A1 | 7/2024 | Ghosh et al. |
| 2024/0249505 A1 | 7/2024 | Balusu et al. |
| 2024/0249506 A1 | 7/2024 | Arora et al. |
| 2024/0257043 A1 | 8/2024 | Zhang et al. |
| 2024/0257047 A1 | 8/2024 | Balusu et al. |
| 2024/0257380 A1 | 8/2024 | Wang et al. |
| 2024/0265565 A1 | 8/2024 | Zhang et al. |
| 2024/0265663 A1 | 8/2024 | Duan et al. |
| 2024/0273463 A1 | 8/2024 | Pachauri et al. |
| 2024/0273863 A1 | 8/2024 | Ghosh et al. |

FOREIGN PATENT DOCUMENTS

| | | |
|---|---|---|
| CN | 110443298 B | 2/2022 |
| CN | 114898358 A | 8/2022 |
| EP | 3217324 A1 | 9/2017 |
| EP | 3437031 | 2/2019 |
| EP | 3479298 | 5/2019 |
| WO | 2006113281 A2 | 10/2006 |
| WO | 2017201490 A1 | 11/2017 |
| WO | 2018093796 | 5/2018 |
| WO | 2020051213 A1 | 3/2020 |
| WO | 2021186176 A1 | 9/2021 |
| WO | 2021247420 A2 | 12/2021 |

OTHER PUBLICATIONS

Shane Thomas, PCT Written Opinion, mailed Apr. 19, 2024, in connection with International Application No. PCT/US2024/12034, all pages.

Chaudhuri, Abon et al.; "A Smart System for Selection of Optimal Product Images in E-Commerce"; 2018 IEEE Conference on Big Data (Big Data); Dec. 10-13, 2018; IEEE; <https://ieeexplore.ieee.org/document/8622259>; pp. 1728-1736.

Chenze, Brandon et al.; "Iterative Approach for Novel Entity Recognition of Foods in Social Media Messages"; 2022 IEEE 23rd International Conference on Information Reuse and Integration for Data Science (IRI); Aug. 9-11, 2022; IEEE; <https://ieeexplore.ieee.org/document/9874231>; pp. 1-6.

Kaur, Ramanpreet et al.; "A Brief Review on Image Stitching and Panorama Creation Methods"; International Journal of Control Theory and Applications; 2017; vol. 10, No. 28; International Science Press; Gurgaon, India; <https://www.researchgate.net/publication/348232877 >; pp. 1-11 pages.

(56) References Cited

OTHER PUBLICATIONS

Naver Engineering Team; "Auto-classification of NAVER Shopping Product Categories using TensorFlow"; <https://blog.tensorflow.org/2019/05/auto-classification-of-naver-shopping.html>; May 20, 2019; pp. 1-15.

Paolanti, Marine et al.; "Mobile robot for retail surveying and inventory using visual and textual analysis of monocular pictures based on deep learning"; European Conference on Mobile Robots; Sep. 2017, 6 pages.

Refills; "Final 3D object perception and localization"; European Commision, Dec. 31, 2016, 16 pages.

Retech Labs; "Storx | RetechLabs"; <https://retechlabs.com/storx/>; available at least as early as Jun. 22, 2019; retrieved from Internet Archive Wayback Machine <https://web.archive.org/web/20190622012152/https://retechlabs.com/storx/> on Dec. 1, 2022; pp. 1-4.

Schroff, Florian et al.; "Facenet: a unified embedding for face recognition and clustering"; 2015 IEEE Conference on Computer Vision and Pattern Recognition (CVPR); Jun. 7-12, 2015; IEEE; <https://ieeexplore.ieee.org/document/7298682>; pp. 815-823.

Singh, Ankit; "Automated Retail Shelf Monitoring Using AI"; <https://blog.paralleldots.com/shelf-monitoring/automated-retail-shelf-monitoring-using-ai/>; Sep. 20, 2019; pp. 1-10.

Singh, Ankit; "Image Recognition and Object Detection in Retail"; <https://blog.paralleldots.com/featured/image-recognition-and-object-detection-in-retail/>; Sep. 26, 2019; pp. 1-11.

Tan, Mingxing et al.; "EfficientDet: Scalable and Efficient Object Detection"; 2020 IEEE/CVF Conference on Computer Vision and Pattern Recognition (CVPR); Jun. 13-19, 2020; IEEE; <https://ieeexplore.ieee.org/document/9156454>; 6 pages.

Tan, Mingxing et al.; "EfficientNet: Rethinking Model Scaling for Convolutional Neural Networks"; Proceedings of the 36th International Conference on Machine Learning; 2019; vol. 97; PLMR; <http://proceedings.mlr.press/v97/tan19a.html>; pp. 6105-6114.

Technology Robotix Society; "Colour Detection"; <https://medium.com/image-processing-in-robotics/colour-detection-e15bc03b3f61>; Jul. 2, 2019; pp. 1-6.

Tonioni, Alessio et al.; "A deep learning pipeline for product recognition on store shelves"; 2018 IEEE International Conference on Image Processing, Applications and Systems (IPAS); Dec. 12-14, 2018; IEEE; <https://ieeexplore.ieee.org/document/8708890>; pp. 25-31.

Trax Retail; "Image Recognition Technology for Retail | Trax"; <https://traxretail.com/retail/>; available at least as early as Apr. 20, 2021; retrieved from Internet Wayback Machine <https://web.archive.org/web/20210420132348/https://traxretail.com/retail/> on Dec. 1, 2022; pp. 1-19.

Verma, Nishchal, et al.; "Object identification for inventory management using convolutional neural network"; IEEE Applied Imagery Pattern Recognition Workshop (AIPR); Oct. 2016, 6 pages.

Zhang, Jicun, et al.; "An Improved Louvain Algorithm for Community Detection"; Advanced Pattern and Structure Discovery from Complex Multimedia Data Environments 2021; Nov. 23, 2021; Mathematical Problems in Engineering; Hindawi; <https://www.hindawi.com/journals/mpe/2021/1485592/>; pp. 1-27.

\* cited by examiner

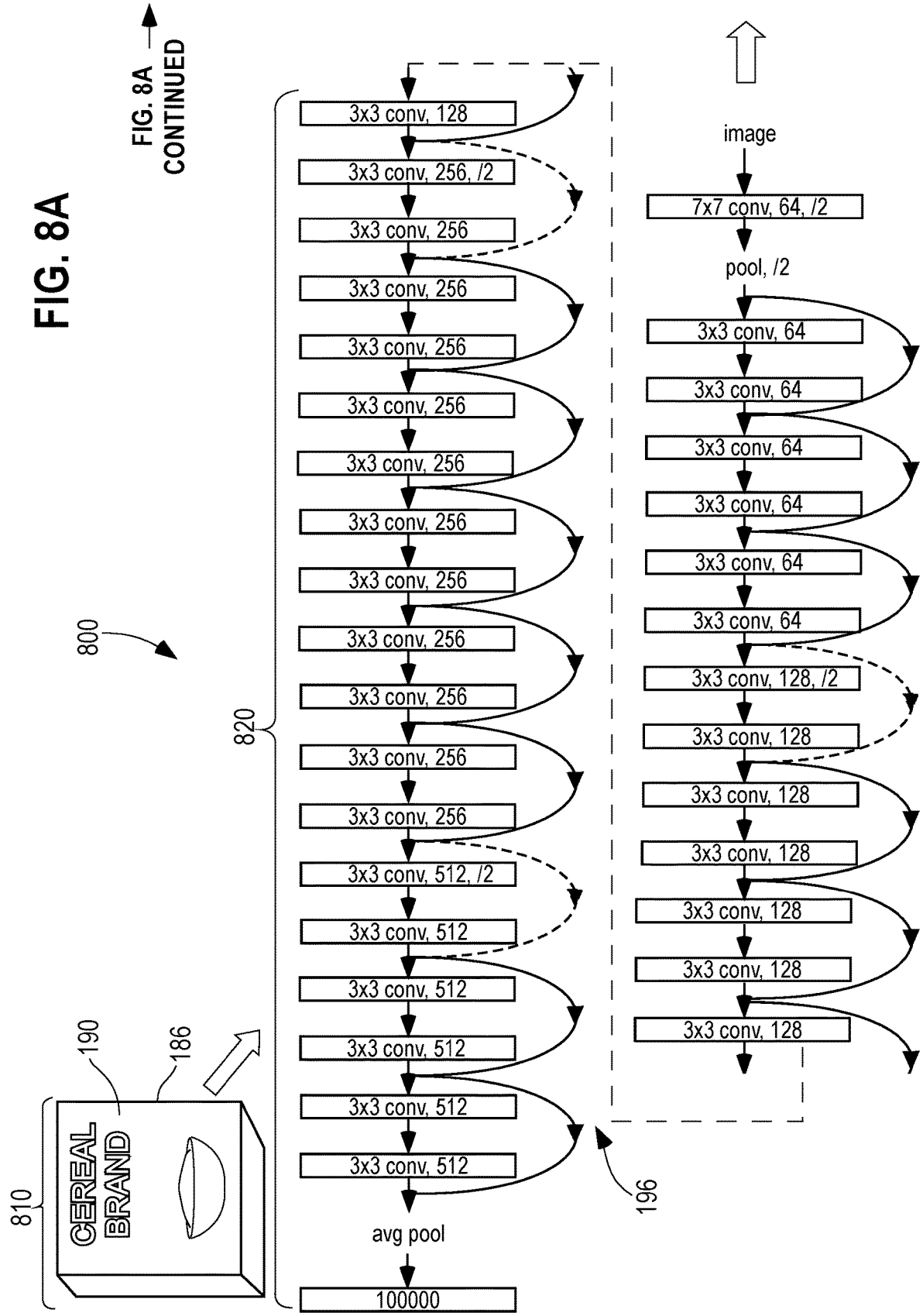

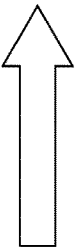

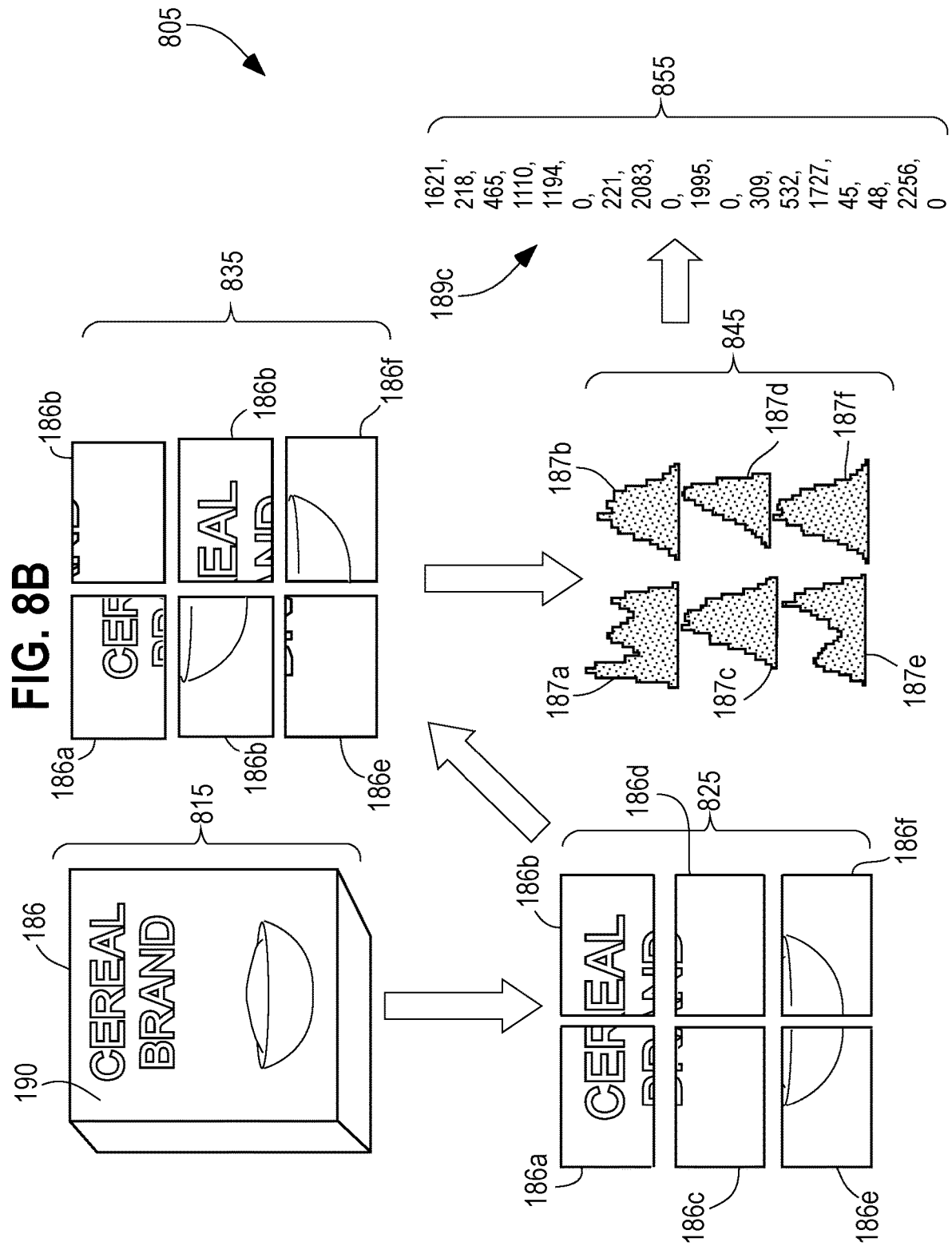

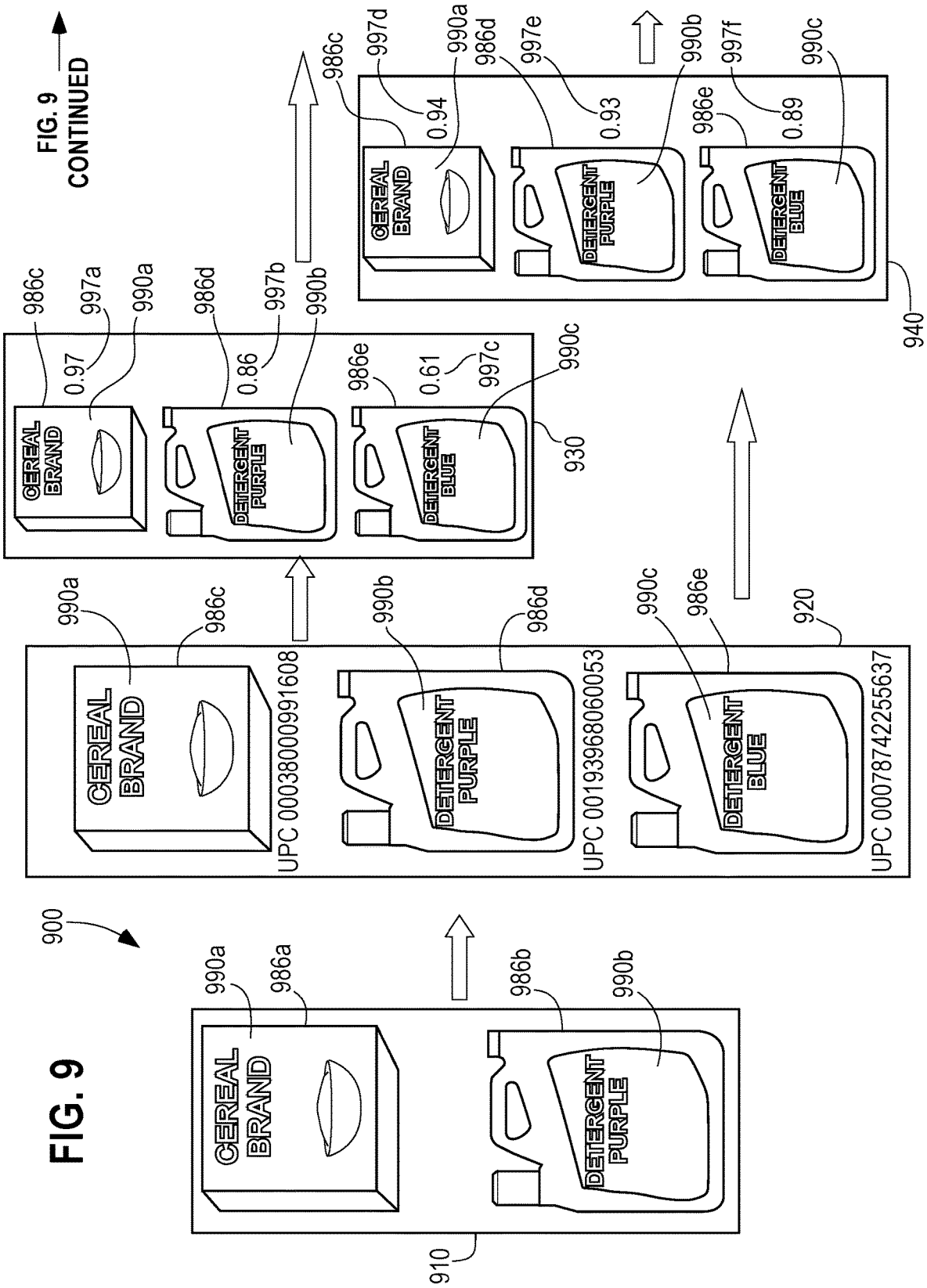

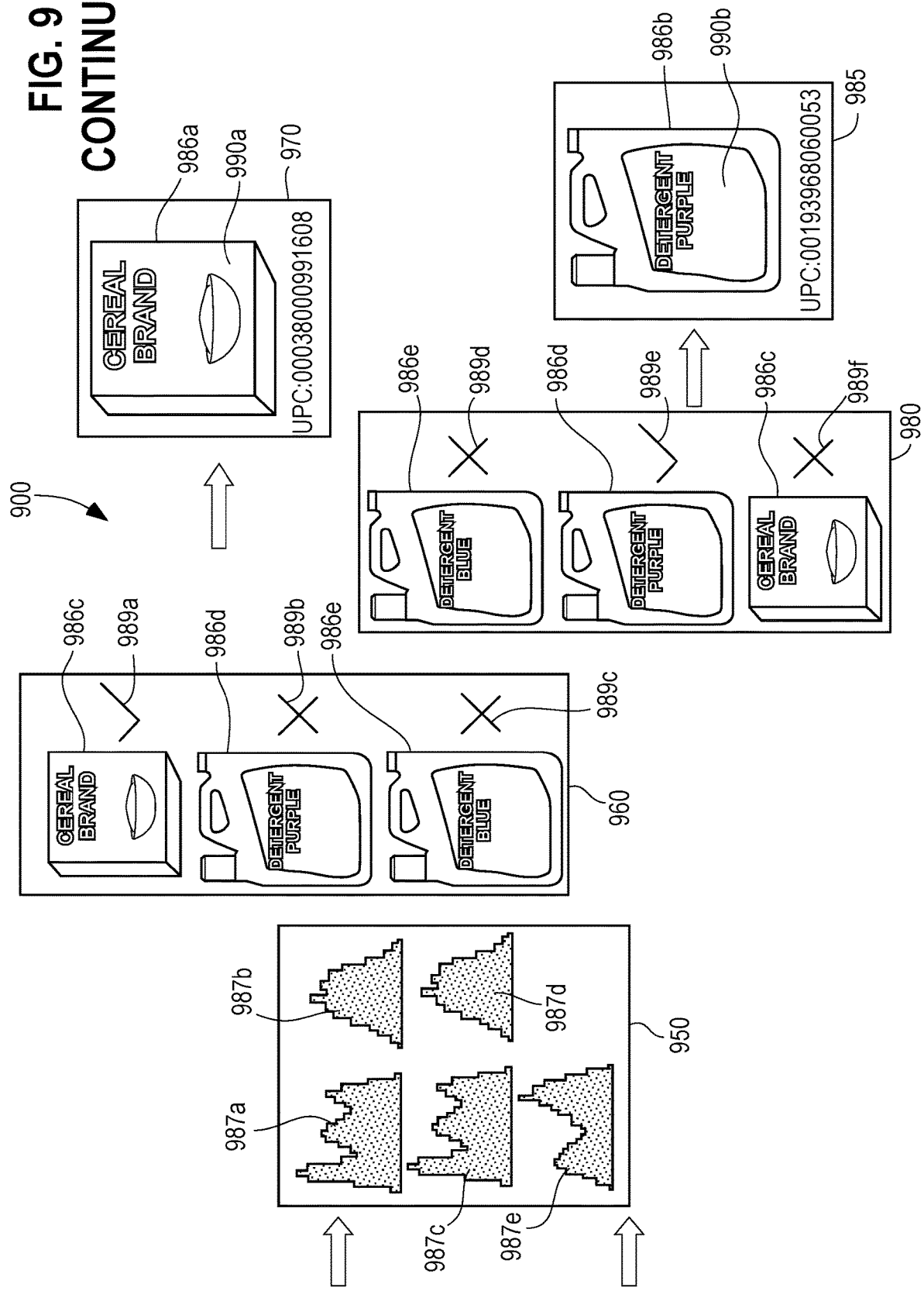

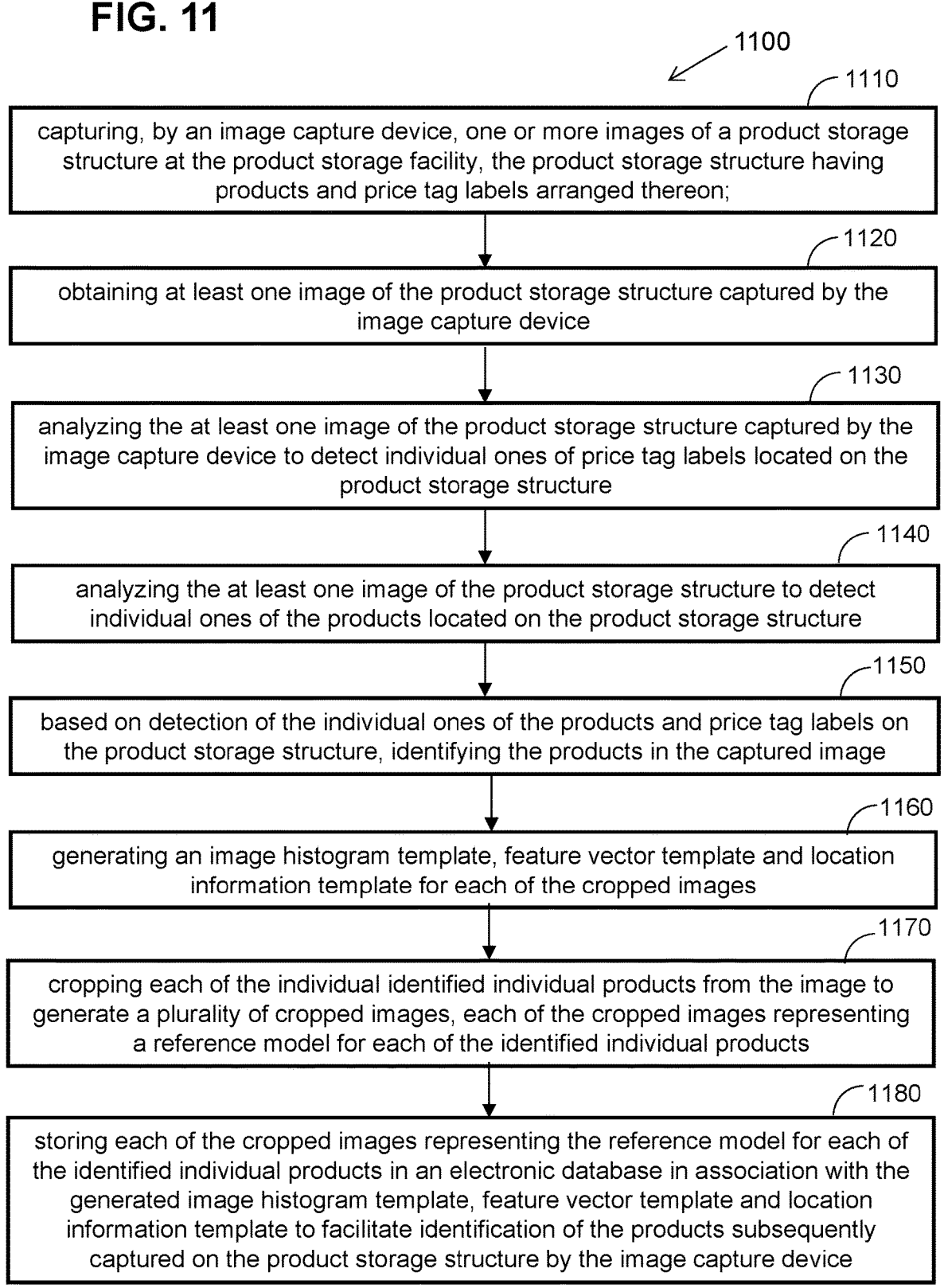

SYSTEMS AND METHODS OF USING CACHED IMAGES TO DETERMINE PRODUCT COUNTS ON PRODUCT STORAGE STRUCTURES OF A PRODUCT STORAGE FACILITY

TECHNICAL FIELD

This disclosure relates generally to managing inventory at product storage facilities, and in particular, to detecting and recognizing products on product storage structures of a product storage facility.

BACKGROUND

A typical product storage facility (e.g., a retail store, a product distribution center, a warehouse, etc.) may have hundreds of shelves and thousands of products stored on the shelves and/or on pallets. Individual products offered for sale to consumers are typically stocked on shelves, pallets, and/or each other in a product storage space having a price tag label assigned thereto. It is common for workers of such product storage facilities to manually (e.g., visually) inspect product display shelves and other product storage spaces to verify whether the on-shelf products are properly labeled with appropriate price tag labels.

Given the very large number of product storage areas such as shelves, pallets, and other product displays at product storage facilities of large retailers, and the even larger number of products stored in the product storage areas, manual inspection of the price tag labels and the products on the shelves/pallets by the workers is very time consuming and significantly increases the operations cost for a retailer, since these workers could be performing other tasks if they were not involved in manually inspecting the product storage areas, price tag labels, and products.

BRIEF DESCRIPTION OF THE DRAWINGS

Disclosed herein are embodiments of detecting and recognizing products at product storage areas of a product storage facility. This description includes drawings, wherein:

FIG. 8A is a flow diagram of an exemplary process of processing the cropped image of FIG. 6 to generate a feature vector template in accordance with some embodiments;

FIG. 8B is a flow diagram of an exemplary process of processing the cropped image of FIG. 6 to generate a block histogram temperate in accordance with some embodiments;

FIG. 9 is a flow diagram of an exemplary process of comparing new candidate cropped images to reference model cropped images stored in an electronic database to identify the products depicted in the new candidate cropped images in accordance with some embodiments;

FIG. 11 is a flow diagram of another exemplary process of detecting and recognizing products at product storage areas of a product storage facility in accordance with some embodiments.

Figure 1:
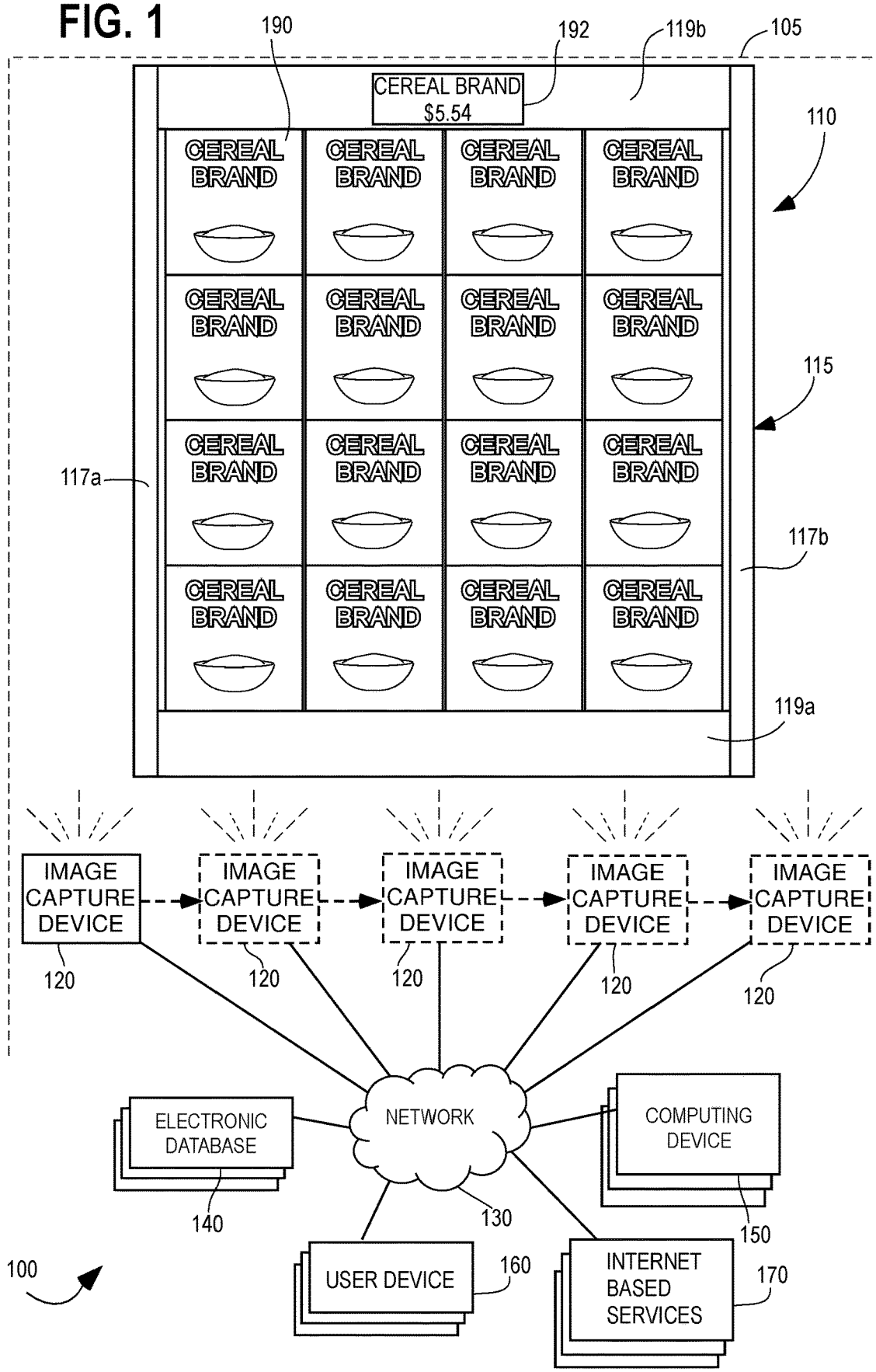
FIG. 1 is a diagram of an exemplary system of detecting and recognizing products at product storage areas of a product storage facility in accordance with some embodiments, depicting a front view of a product storage structure storing exemplary identical individual units of a product having a price tag label associated therewith, the product storage structure being monitored by an image capture device that is configured to move about the product storage facility.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required.

The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may but do not necessarily, all refer to the same embodiment.

Generally, systems and methods of detecting and recognizing products on product storage structures of a product storage facility include an image capture device that moves about and captures images of the product storage structures at the product storage facility. A computing device processes the obtained images to detect and identify the products on the product storage structure, crops each of the identified individual products from the image to generate a plurality of cropped images and generates an image histogram template, feature vector template and location information template for each of the cropped images. The cropped images are stored in an electronic database and represent a reference model for each of the identified individual products and are stored in association with the generated image histogram template, feature vector template and location information template to facilitate identification of products subsequently captured on the product storage structure by the image capture device.

In some embodiments, a system for detecting and recognizing products in product storage areas of a product storage facility includes an image capture device having a field of view that includes at least a portion of a product storage structure located in a product storage area of the product storage facility, the product storage structure having products and price tag labels arranged thereon, wherein the image capture device is configured to capture one or more images of the product storage structure. The system further includes a computing device including a control circuit, the computing device being communicatively coupled to the image capture device. The control circuit is configured to: obtain at least one image of the product storage structure captured by the image capture device; analyze the at least one image of the product storage structure captured by the image capture device to detect at least one of individual ones of price tag labels located on the product storage structure and individual ones of the products located on the product storage structure; recognize the individual products in the at least one image as corresponding to a known product identifier; crop each of the recognized individual products from the at least one image to generate a plurality of cropped images, each of the cropped images representing a reference model for each of the recognized individual products; generate an image histogram template, feature vector template and location information template for each of the cropped images; and store each of the cropped images representing the reference model for each of the recognized individual products in an electronic database in association with the generated image histogram template, feature vector template and location information template to facilitate recognition of the products subsequently captured on the product storage structure by the image capture device.

In some embodiments, a method of detecting and recognizing products on product storage structures at a product storage facility includes: capturing, by an image capture device, one or more images of at least a portion of a product storage structure in a product storage area of the product storage facility, the product storage structure having products and price tag labels arranged thereon; and by a computing device including a control circuit and communicatively coupled to the image capture device: obtaining at least one image of the product storage structure captured by the image capture device; analyzing the at least one image of the product storage structure captured by the image capture device to detect at least one of individual ones of price tag labels located on the product storage structure and individual ones of the products located on the product storage structure; recognizing the individual products in the at least one image as corresponding to a known product identifier; cropping each of the recognized individual products from the at least one image to generate a plurality of cropped images, each of the cropped images representing a reference model for each of the recognized individual products; generating an image histogram template, feature vector template and location information template for each of the cropped images; and storing each of the cropped images representing the reference model for each of the recognized individual products in an electronic database in association with the generated image histogram template, feature vector template and location information template to facilitate recognition of the products subsequently captured on the product storage structure by the image capture device.

In some embodiments, a system for detecting and recognizing products in product storage areas of a product storage facility includes an electronic database storing cropped images representing reference models for individual products that were previously recognized and associated with known product identifiers, each of the reference model cropped images being stored in the electronic database in association with at least one of an image-specific image histogram template, feature vector template and location information template. The system further includes a computing device including a control circuit, the computing device being communicatively coupled to the image capture device. The control circuit is configured to: obtain at least one new cropped image of a product detected on a storage structure of the product storage facility; compare the individual product detected on the product storage structure in the at least one new cropped image to the cropped images stored in the electronic database and representing the reference models for the recognized individual products; based on detecting a match between the individual product detected in the at least one new image to one of the cropped images stored in the electronic database and representing the reference models for the recognized individual products, recognize the individual product detected in the at least one new image and associate the recognized individual product detected in the at least one new image with a respective one of the known product identifiers; and update the electronic database to include a count of a number of units of the recognized individual product detected in the at least one new image on the product storage structure.

FIG. 1 shows an embodiment of a system 100 of detecting and recognizing products 190 on product storage structures 115 of a product storage facility 105 (which may be a retail store, a product distribution center, a warehouse, etc.). The system 100 is illustrated in FIG. 1 for simplicity with only one movable image capture device 120 that moves about one product storage area 110 containing one product storage structure 115, but it will be appreciated that, depending on the size of the product storage facility 105 being monitored, the system 100 may include multiple movable image capture devices 120 located throughout the product storage facility 105 that monitor hundreds of product storage areas 110 of and thousands of product storage structures 115. It is understood the direction and type of movement of the image capture device 120 about the product storage area 110 of the product storage facility 105 may depend on the physical arrangement of the product storage area 110 and/or the size and shape of the product storage structure 115. For example, the image capture device 120 may move linearly down an aisle alongside a product storage structure 115 (e.g., a shelving unit) located in a product storage area 110 of a product storage facility 105, or may move in a circular fashion around a table having curved/multiple sides. Notably, while the price tag label 192 is referred to herein as an "on-shelf price tag label," it will be appreciated that the price tag label 192 does not necessarily have to be affixed to horizontal support members 119a or 119b (which may be shelves, etc.) of the product storage structure 115 as shown in FIG. 1 and may be located in a different location (e.g., on the vertical support members 117a-117b (which may be support posts interconnecting the shelves).

Notably, the term "product storage structure" as used herein generally refers to a structure on which the products 190 are stored, and may include a pallet, a shelf cabinet, a single shelf, table, rack, refrigerator, freezer, displays, bins, gondola, case, countertop, or another product display. Likewise, it will be appreciated that the number (e.g., 16 shown in FIG. 1) of individual products 190 representing individual units of an identical product (generically labeled as "Cereal Brand" in FIG. 1, but may be any other retail product that is stocked in a product storage facility) is chosen for simplicity and by way of example only, and that the product storage structure 115 may store any number of units of product 190 thereon. Further, the size and shape of the products 190 in FIG. 1 have been shown by way of example only, and it will be appreciated that the individual products 190 may be of various sizes and shapes. Notably, the term "products" may refer to individual product 190 (some of which may be single-piece/single-component products and some of which may be multi-piece/multi-component products), as well as to packages or containers of the product 190, which may be plastic- or paper-based packaging that includes multiple units of a given product 190 (e.g., a plastic wrap that includes 36 rolls of identical paper towels, a paper box that includes 10 packs of identical diapers, etc.). Alternatively, the packaging of the individual products 190 may be a plastic- or paper-based container that encloses one individual product 190 (e.g., a box of cereal as shown in FIG. 1, a bottle of shampoo, etc.).

The image capture device 120 (also referred to as an image capture unit) of the exemplary system 100 depicted in FIG. 1 is configured for movement about the product storage facility 105 (e.g., on the floor via a motorized or non-motorized wheel-based and/or track-based locomotion system, or via slidable tracks above the floor, etc.) such that, when moving (e.g., about an aisle or other area of a product storage facility 105), the image capture device 120 has a field of view that includes at least a portion the product storage structure 115 within the product storage area 110 of the product storage facility 105, permitting the image capture device 120 to capture multiple images of the product storage area 110 and the product storage structure 115 from various viewing angles. In some embodiments, the image capture device 120 is configured as robotic device that moves without being physically operated/manipulated by a human operator (as described in more detail below). In other embodiments, the image capture device 120 is configured to be driven or manually pushed (e.g., like a cart or the like) by a human operator. In still further embodiments, the image capture device 120 may be a hand-held or a wearable device (e.g., a camera, phone, tablet, or the like) that may be carried and/or work by a worker at the product storage facility 105 while the worker moves about the product storage facility 105. In some embodiments, the image capture device 120 may be incorporated into another mobile device (e.g., a floor cleaner, floor sweeper, forklift, etc.), the primary purpose of which is independent of capturing images of product storage areas 110 of the product storage facility 105.

In some embodiments, as will be described in more detail below, the images of the product storage area 110 captured by the image capture device 120 while moving about the product storage area are transmitted by the image capture device 120 over a network 130 to an electronic database 140 and/or to a computing device 150. In some aspects, the computing device 150 (or a separate image processing internet based/cloud-based service module) is configured to process such images as will be described in more detail below.

The exemplary system 100 includes an electronic database 140. Generally, the exemplary electronic database 140 of FIG. 1 may be configured as a single database, or a collection of multiple communicatively connected databases (e.g., digital image database, meta data database, inventory database, pricing database, customer database, vendor database, manufacturer database, etc.) and is configured to store various raw and processed images (e.g., 180, 182) of the product storage area 110 captured by the image capture device 120 while the image capture device 120 is moving about the product storage facility 105, as well as cropped images 186 of the products 190, as well as various data sets representing image histogram, feature vector, and location information templates associated with the cropped images 186 of the products 190, as well as total counts of products 190 detected on the product storage structures 115 of a product storage facility 105 in the images 180 captured by the image capture device 120.

In some embodiments, the electronic database 140 and the computing device 150 may be implemented as two separate physical devices located at the product storage facility 105. It will be appreciated, however, that the computing device 150 and the electronic database 140 may be implemented as a single physical device and/or may be located at different (e.g., remote) locations relative to each other and relative to the product storage facility 105. In some aspects, the electronic database 140 may be stored, for example, on non-volatile storage media (e.g., a hard drive, flash drive, or removable optical disk) internal or external to the computing device 150, or internal or external to computing devices distinct from the computing device 150. In some embodiments, the electronic database 140 may be cloud-based.

The system 100 of FIG. 1 further includes a computing device 150 (which may be one or more computing devices as pointed out below) configured to communicate with the electronic database 140 (which may be one or more databases as pointed out below), the image capture device 120, user device 160 (which may be one or more user devices as pointed out below), and/or internet-based service 170 (which may be one or more internet-based services as pointed out below) over the network 130. The exemplary network 130 depicted in FIG. 1 may be a wide-area network (WAN), a local area network (LAN), a personal area network (PAN), a wireless local area network (WLAN), Wi-Fi, Zigbee, Bluetooth (e.g., Bluetooth Low Energy (BLE) network), or any other internet or intranet network, or combinations of such networks. Generally, communication between various electronic devices of system 100 may take place over hard-wired, wireless, cellular, Wi-Fi or Bluetooth networked components or the like. In some embodiments, one or more electronic devices of system 100 may include cloud-based features, such as cloud-based memory storage. In some embodiments, the one or more computing devices 150, one or more electronic databases 140, one or more user devices 160, and/or portions of the network 130 are located at, or in the product storage facility 105.

The computing device 150 may be a stationary or portable electronic device, for example, a desktop computer, a laptop computer, a single server or a series of communicatively connected servers, a tablet, a mobile phone, or any other electronic device including a control circuit (i.e., control unit) that includes a programmable processor. The computing device 150 may be configured for data entry and processing as well as for communication with other devices of system 100 via the network 130. As mentioned above, the computing device 150 may be located at the same physical location as the electronic database 140, or may be located at a remote physical location relative to the electronic database 140.

Figure 2:
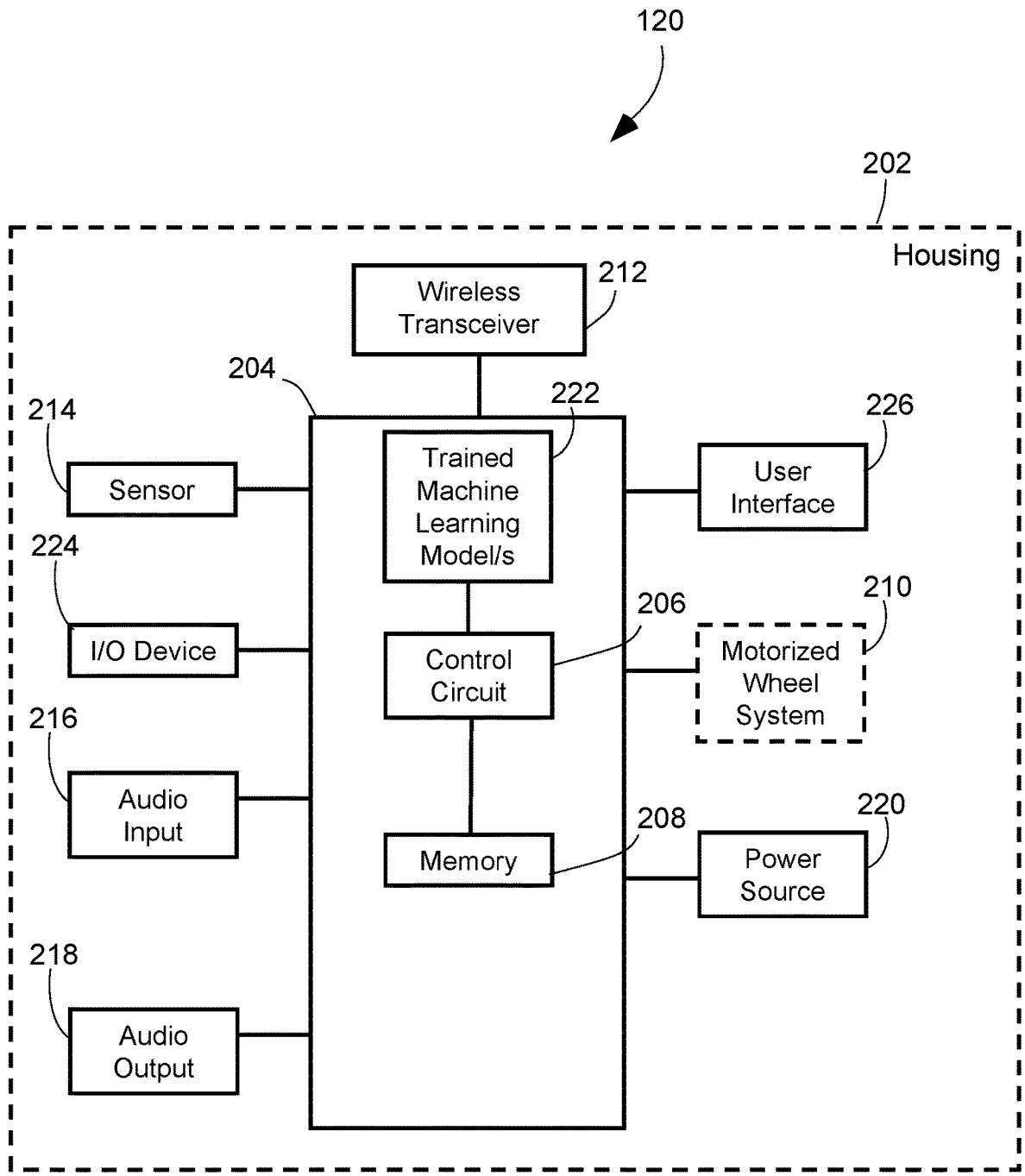
FIG. 2 comprises a block diagram of an exemplary image capture device in accordance with some embodiments.

FIG. 2 presents a more detailed example of an exemplary motorized robotic unit or image capture device 120. As mentioned above, the image capture device 102 does not necessarily need an autonomous motorized wheel-based and/or track-based system to move about the product storage facility 105, and may instead be moved (e.g., driven, pushed, carried, worn, etc.) by a human operator, or may be movably coupled to a track system (which may be above the floor level or at the floor level) that permits the image capture device 120 to move about the product storage facility 105 while capturing images of various product storage areas 110 of the product storage facility 105. In the example shown in FIG. 2, the motorized image capture device 120 has a housing 202 that contains (partially or fully) or at least supports and carries a number of components. These components include a control unit 204 comprising a control circuit 206 that controls the general operations of the motorized image capture device 120 (notably, in some implementations, the control circuit 310 of the computing device 150 may control the general operations of the image capture device 120). Accordingly, the control unit 204 also includes a memory 208 coupled to the control circuit 206 and that stores, for example, computer program code, operating instructions and/or useful data, which when executed by the control circuit implement the operations of the image capture device.

The control circuit 206 of the exemplary motorized image capture device 120 of FIG. 2, operably couples to a motorized wheel system 210, which, as pointed out above, is optional (and for this reason represented by way of dashed lines in FIG. 2). This motorized wheel system 210 functions as a locomotion system to permit the image capture device 120 to move within the product storage facility 105 (thus, the motorized wheel system 210 may be more generically referred to as a locomotion system). Generally, this motorized wheel system 210 may include at least one drive wheel (i.e., a wheel that rotates about a horizontal axis) under power to thereby cause the image capture device 120 to move through interaction with, e.g., the floor of the product storage facility 105. The motorized wheel system 210 can include any number of rotating wheels and/or other alternative floor-contacting mechanisms (e.g., tracks, etc.) as may be desired and/or appropriate to the application setting.

The motorized wheel system 210 may also include a steering mechanism of choice. One simple example may comprise one or more wheels that can swivel about a vertical axis to thereby cause the moving image capture device 120 to turn as well. It should be appreciated that the motorized wheel system 210 may be any suitable motorized wheel and track system known in the art capable of permitting the image capture device 120 to move within the product storage facility 105. Further elaboration in these regards is not provided here for the sake of brevity save to note that the aforementioned control circuit 206 is configured to control the various operating states of the motorized wheel system 210 to thereby control when and how the motorized wheel system 210 operates.

In the exemplary embodiment of FIG. 2, the control circuit 206 operably couples to at least one wireless transceiver 212 that operates according to any known wireless protocol. This wireless transceiver 212 can comprise, for example, a Wi-Fi-compatible and/or Bluetooth-compatible transceiver (or any other transceiver operating according to known wireless protocols) that can wirelessly communicate with the aforementioned computing device 150 via the aforementioned network 130 of the product storage facility 105. So configured, the control circuit 206 of the image capture device 120 can provide information to the computing device 150 (via the network 130) and can receive information and/or movement instructions from computing device 150. For example, the control circuit 206 can receive instructions from the computing device 150 via the network 130 regarding directional movement (e.g., specific predetermined routes of movement) of the image capture device 120 throughout the space of the product storage facility 105. These teachings will accommodate using any of a wide variety of wireless technologies as desired and/or as may be appropriate in a given application setting. These teachings will also accommodate employing two or more different wireless transceivers 212, if desired.

In the embodiment illustrated in FIG. 2, the control circuit 206 also couples to one or more on-board sensors 214 of the image capture device 120. These teachings will accommodate a wide variety of sensor technologies and form factors. According to some embodiments, the image capture device 120 can include one or more sensors 214 including but not limited to an optical sensor, a photo sensor, an infrared sensor, a 3-D sensor, a depth sensor, a digital camera sensor, a laser imaging, detection, and ranging (LIDAR) sensor, a mobile electronic device (e.g., a cell phone, tablet, or the like), a quick response (QR) code sensor, a radio frequency identification (RFID) sensor, a near field communication (NFC) sensor, a stock keeping unit (SKU) sensor, a barcode (e.g., electronic product code (EPC), universal product code (UPC), European article number (EAN), global trade item number (GTIN)) sensor, or the like.

By one optional approach, an audio input 216 (such as a microphone) and/or an audio output 218 (such as a speaker) can also operably couple to the control circuit 206. So configured, the control circuit 206 can provide a variety of audible sounds to thereby communicate with workers at the product storage facility 105 or other motorized image capture devices 120 moving about the product storage facility 105. These audible sounds can include any of a variety of tones and other non-verbal sounds. Such audible sounds can also include, in lieu of the foregoing or in combination therewith, pre-recorded or synthesized speech.

The audio input 216, in turn, provides a mechanism whereby, for example, a user (e.g., a worker at the product storage facility 105) provides verbal input to the control circuit 206. That verbal input can comprise, for example, instructions, inquiries, or information. So configured, a user can provide, for example, an instruction and/or query (.g., where is product storage structure number so-and-so?, how many products are stocked on product storage structure so-and-so? etc.) to the control circuit 206 via the audio input 216.

In the embodiment illustrated in FIG. 2, the motorized image capture device 120 includes a rechargeable power source 220 such as one or more batteries. The power provided by the rechargeable power source 220 can be made available to whichever components of the motorized image capture device 120 require electrical energy. By one approach, the motorized image capture device 120 includes a plug or other electrically conductive interface that the control circuit 206 can utilize to automatically connect to an external source of electrical energy to thereby recharge the rechargeable power source 220.

In some embodiments, the motorized image capture device 120 includes an input/output (I/O) device 224 that is coupled to the control circuit 206. The I/O device 224 allows an external device to couple to the control unit 204. The function and purpose of connecting devices will depend on the application. In some examples, devices connecting to the I/O device 224 may add functionality to the control unit 204, allow the exporting of data from the control unit 206, allow the diagnosing of the motorized image capture device 120, and so on.

In some embodiments, the motorized image capture device 120 includes a user interface 226 including for example, user inputs and/or user outputs or displays depending on the intended interaction with the user (e.g., worker at the product storage facility 105). For example, user inputs could include any input device such as buttons, knobs, switches, touch sensitive surfaces or display screens, and so on. Example user outputs include lights, display screens, and so on. The user interface 226 may work together with or separate from any user interface implemented at an optional user interface unit or user device 160 (such as a smart phone or tablet device) usable by a worker at the product storage facility 105. In some embodiments, the user interface 226 is separate from the image capture device 120, e.g., in a separate housing or device wired or wirelessly coupled to the image capture device 120. In some embodiments, the user interface 226 may be implemented in a mobile user device 160 carried by a person (e.g., worker at product storage facility 105) and configured for communication over the network 130 with the image capture device 120.

In some embodiments, the motorized image capture device 120 may be controlled by the computing device 150 or a user (e.g., by driving or pushing the image capture device 120 or sending control signals to the image capture device 120 via the user device 160) on-site at the product storage facility 105 or off-site. This is due to the architecture of some embodiments where the computing device 150 and/or user device 160 outputs the control signals to the motorized image capture device 120. These controls signals can originate at any electronic device in communication with the computing device 150 and/or motorized image capture device 120. For example, the movement signals sent to the motorized image capture device 120 may be movement instructions determined by the computing device 150; commands received at the user device 160 from a user; and commands received at the computing device 150 from a remote user not located at the product storage facility 105.

In the embodiment illustrated in FIG. 2, the control unit 204 includes a memory 208 coupled to the control circuit 206 and that stores, for example, computer program code, operating instructions and/or useful data, which when executed by the control circuit implement the operations of the image capture device. The control circuit 206 can comprise a fixed-purpose hard-wired platform or can comprise a partially or wholly programmable platform. These architectural options are well known and understood in the art and require no further description here. This control circuit 206 is configured (for example, by using corresponding programming stored in the memory 208 as will be well understood by those skilled in the art) to carry out one or more of the steps, actions, and/or functions described herein. The memory 208 may be integral to the control circuit 206 or can be physically discrete (in whole or in part) from the control circuit 206 as desired. This memory 208 can also be local with respect to the control circuit 206 (where, for example, both share a common circuit board, chassis, power supply, and/or housing) or can be partially or wholly remote with respect to the control circuit 206. This memory 208 can serve, for example, to non-transitorily store the computer instructions that, when executed by the control circuit 206, cause the control circuit 206 to behave as described herein.

In some embodiments, the control circuit 206 may be communicatively coupled to one or more trained computer vision/machine learning/neural network modules/models 222 to perform at some of the functions. For example, the control circuit 310 may be trained to process one or more images 180 of product storage areas 110 at the product storage facility 105 to detect and/or recognize one or more products 190 using one or more machine learning algorithms, including but not limited to Linear Regression, Logistic Regression, Decision Tree, SVM, Naïve Bayes, kNN, K-Means, Random Forest, Dimensionality Reduction Algorithms, and Gradient Boosting Algorithms. In some embodiments, the trained machine learning module/model 222 includes a computer program code stored in a memory 208 and/or executed by the control circuit 206 to process one or more images 180, as described in more detail below.

It is noted that not all components illustrated in FIG. 2 are included in all embodiments of the motorized image capture device 120. That is, some components may be optional depending on the implementation of the motorized image capture device 120. It will be appreciated that while the image capture device 120 of FIG. 2 is a motorized robotic unit capable of moving about the product storage facility 105 while being controlled remotely (e.g., by the computing device 150) and without being controlled by an onboard human operator, in some embodiments, the image capture device 120 may be configured to permit an onboard human operator (i.e., driver) to direct the movement of the image capture device 120 about the product storage facility 105.

Figure 3:
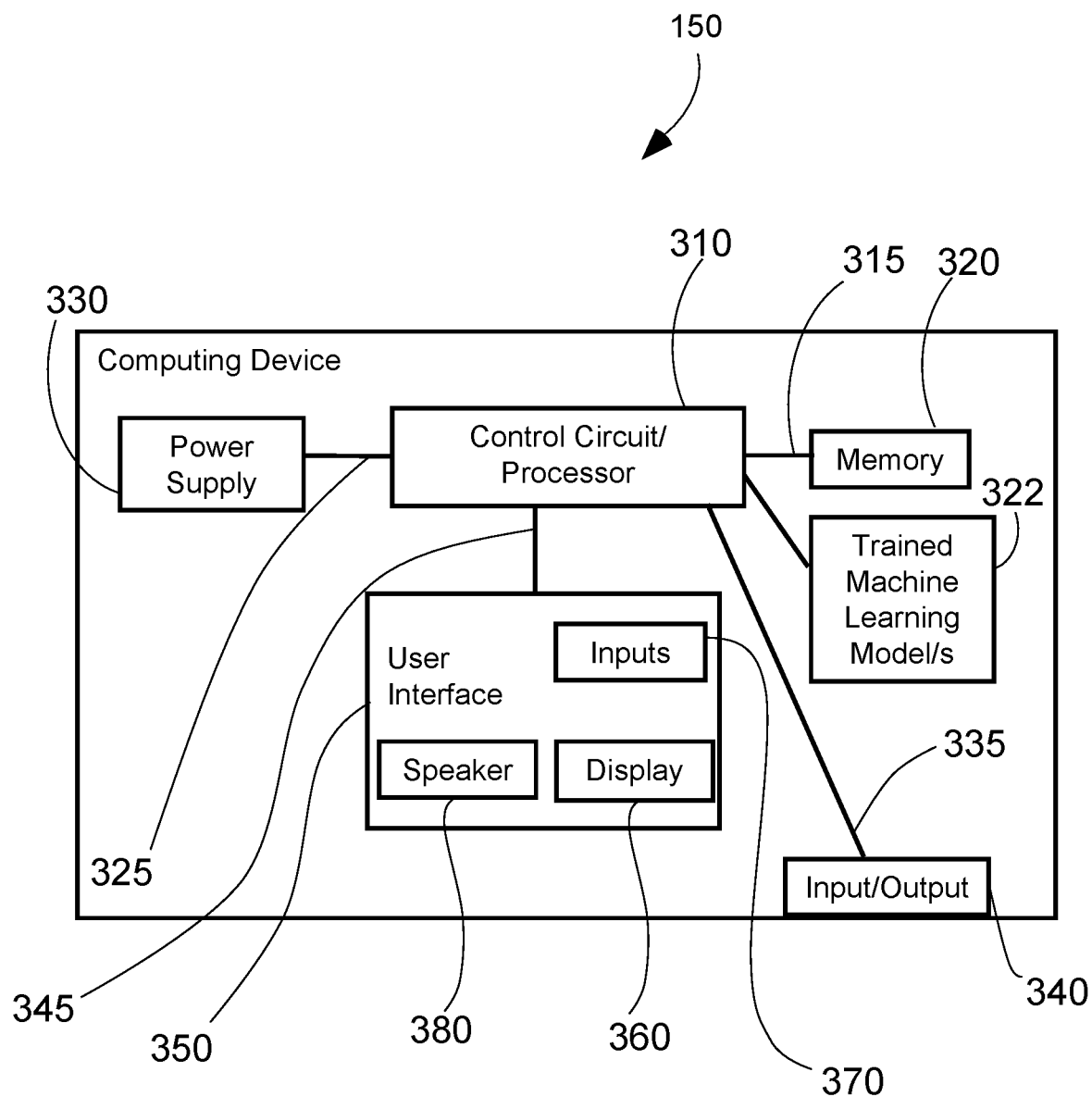
FIG. 3 is a functional block diagram of an exemplary computing device in accordance with some embodiments.

With reference to FIG. 3, the exemplary computing device 150 configured for use with exemplary systems and methods described herein may include a control circuit 310 including a programmable processor (e.g., a microprocessor or a microcontroller) electrically coupled via a connection 315 to a memory 320 and via a connection 325 to a power supply 330. The control circuit 310 can comprise a fixed-purpose hard-wired platform or can comprise a partially or wholly programmable platform, such as a microcontroller, an application specification integrated circuit, a field programmable gate array, and so on. These architectural options are well known and understood in the art and require no further description here.

The control circuit 310 can be configured (for example, by using corresponding programming stored in the memory 320 as will be well understood by those skilled in the art) to carry out one or more of the steps, actions, and/or functions described herein. In some embodiments, the memory 320 may be integral to the processor-based control circuit 310 or can be physically discrete (in whole or in part) from the control circuit 310 and is configured non-transitorily store the computer instructions that, when executed by the control circuit 310, cause the control circuit 310 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM)) as well as volatile memory (such as an erasable programmable read-only memory (EPROM))). Accordingly, the memory and/or the control unit may be referred to as a non-transitory medium or non-transitory computer readable medium.

Figure 4:
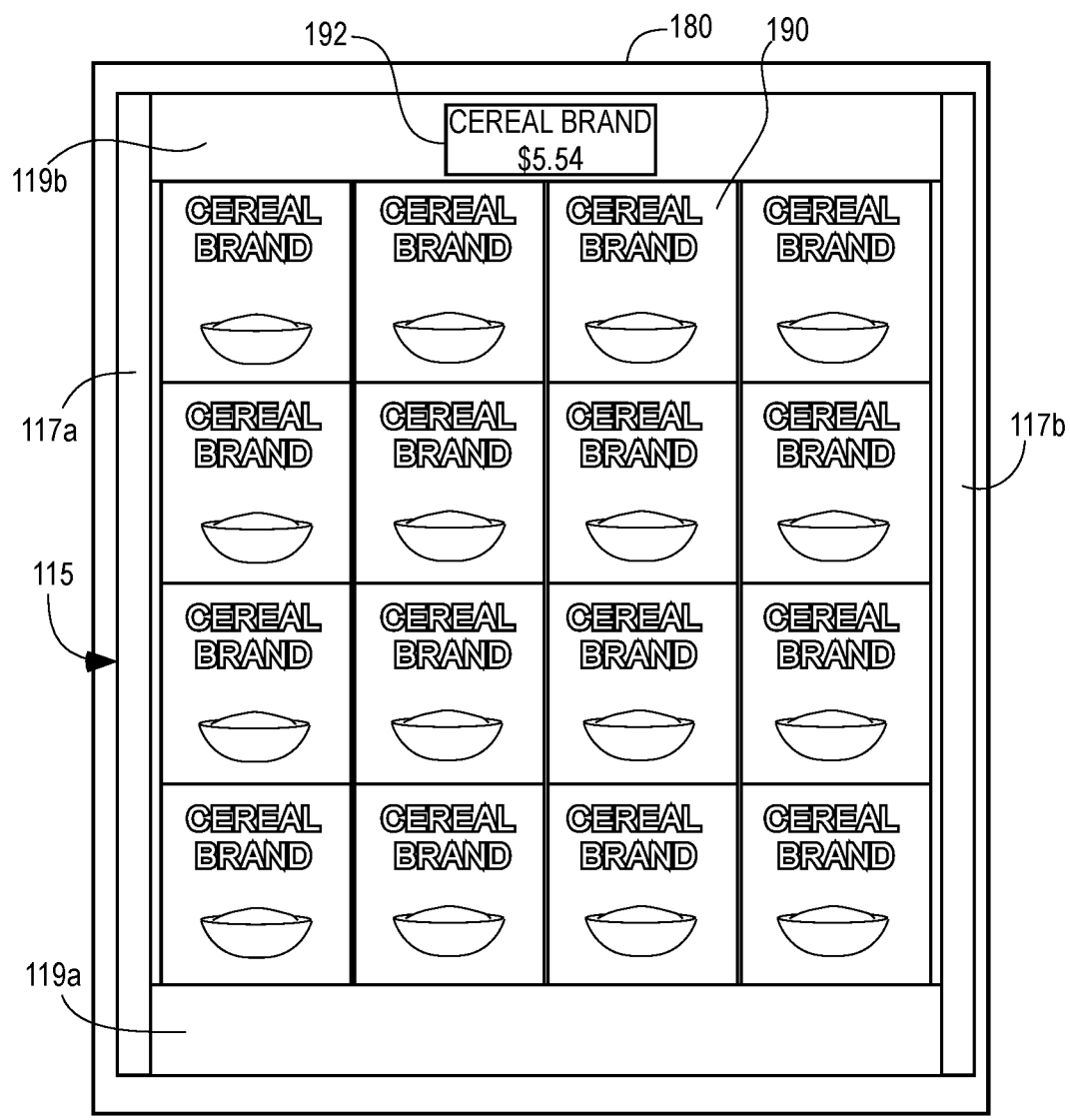
FIG. 4 is a diagram of an exemplary image of the product storage structure of FIG. 1 taken by the image capture device, showing the product storage structure of FIG. 1 and all of the products and price tag label thereon.
Figure 5:
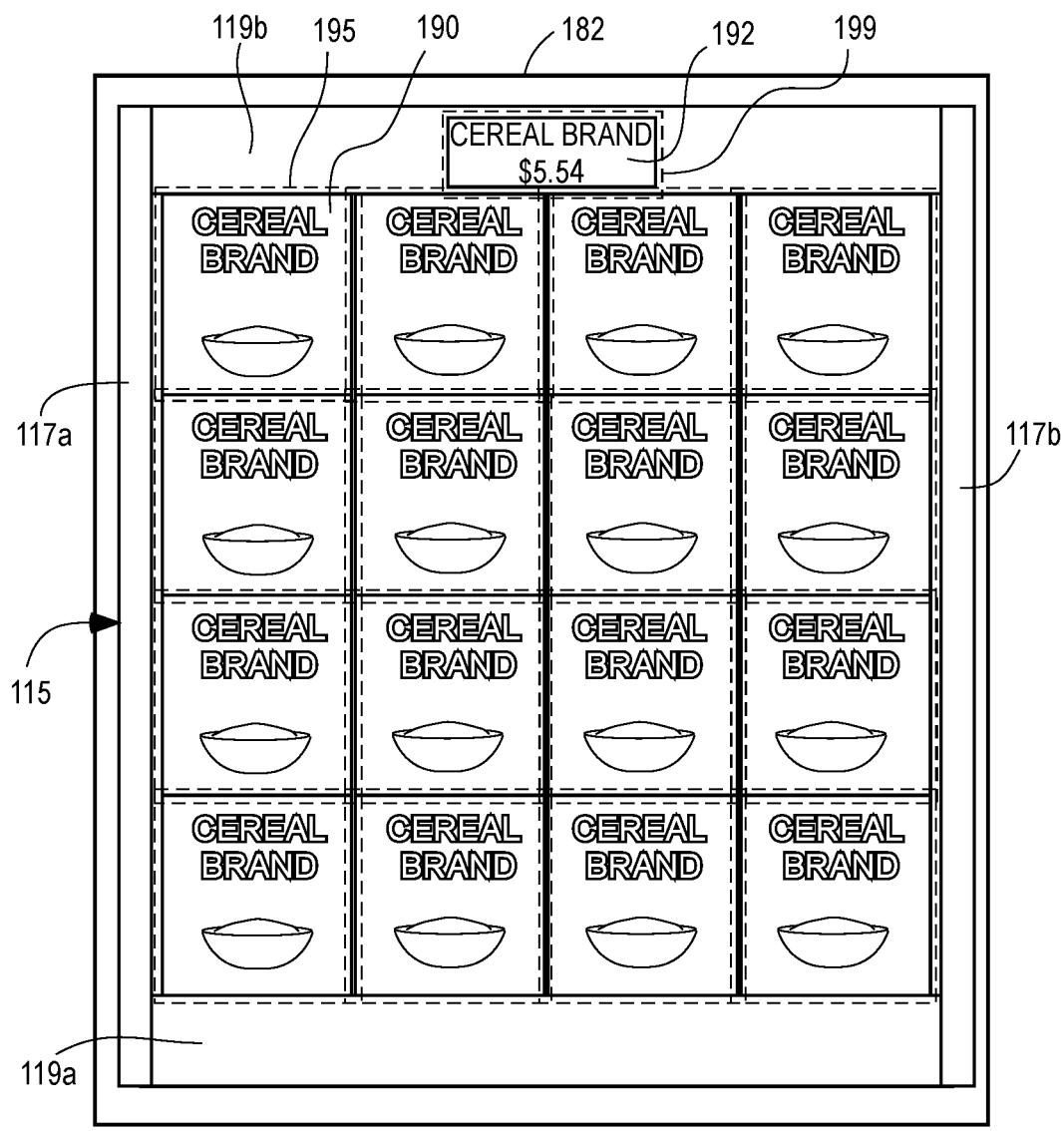
FIG. 5 is a diagram of the exemplary image of FIG. 4, after the image is processed to detect the individual products and the price tag label located on the product storage structure and to generate virtual boundary lines around each of the products and the price tag label detected in the image.
Figure 6:
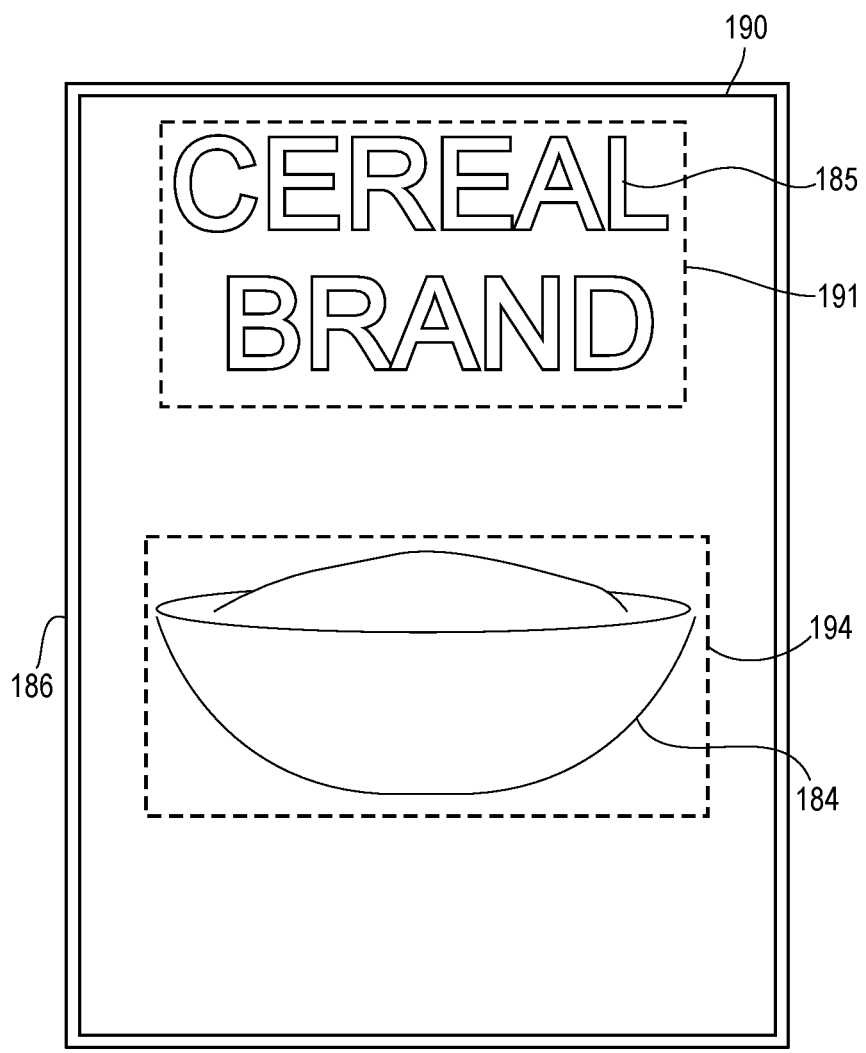
FIG. 6 is a diagram of an enlarged portion of the image of FIG. 5, after the image is processed to crop out an individual one of the products.

The control circuit 310 of the computing device 150 is also electrically coupled via a connection 335 to an input/output 340 that can receive signals from, for example, from the image capture device 120, the electronic database 140, internet-based service 170 (e.g., one or more of an image processing service, computer vision service, neural network service, etc.), and/or from another electronic device (e.g., an electronic device or user device 160 of a worker tasked with physically inspecting the product storage area 110 and/or the product storage structure 115 and observing the individual products 190 stocked thereon). The input/output 340 of the computing device 150 can also send signals to other devices, for example, a signal to the electronic database 140 including a raw image 180 of a product storage structure 115 as shown in FIG. 4, or a processed image 182 of the product storage structure 115 as shown in FIG. 5, or a cropped image 186 of the product 190 as shown in FIG. 6. Also, a signal may be sent by the computing device 150 via the input/output 340 to the image capture device 120 to, e.g., provide a route of movement for the image capture device 120 through the product storage facility 105.

The processor-based control circuit 310 of the computing device 150 shown in FIG. 3 is electrically coupled via a connection 345 to a user interface 350, which may include a visual display or display screen 360 (e.g., LED screen) and/or button input 370 that provide the user interface 350 with the ability to permit an operator of the computing device 150 (e.g., worker at a the product storage facility 105 (or a worker at a remote regional center) tasked with monitoring the inventory and/or ensuring the product are correctly labeled at the product storage facility 105 to manually control the computing device 150 by inputting commands via touch-screen and/or button operation and/or voice commands. Possible commands may for example, cause the computing device 150 to cause transmission of an alert signal to electronic mobile user device/s 160 of a worker/s at the product storage facility 105 to assign a task to the worker that requires the worker to, e.g., visually inspect and/or relabel and/or restock a given product storage structure 115 based on analysis by the computing device 150 of the image 180 of the product storage structure 115 captured by the image capture device 120.

In some embodiments, the user interface 350 of the computing device 150 may also include a speaker 380 that provides audible feedback (e.g., alerts) to the operator of the computing device 150. It will be appreciated that the performance of such functions by the processor-based control circuit 310 of the computing device 150 is not dependent on a human operator, and that the control circuit 310 of the computing device 150 may be programmed to perform such functions without a human operator.

As pointed out above, in some embodiments, the image capture device 120 moves about the product storage facility 105 (while being controlled remotely by the computing device 150 (or another remote device such one or more user devices 160)), or while being controlled autonomously by the control circuit 206 of the image capture device 120), or while being manually driven or pushed by a worker of the product storage facility 105. When the image capture device 120 moves about the product storage area 110 as shown in FIG. 1, the sensor 214 of the image capture device 120, which may be one or more digital cameras, captures (in sequence and at predetermined intervals) multiple images of the product storage area 110 and the product storage structure 115 from various angles. In certain aspects, the image capture device 120 is configured to move about the product storage area 110 while capturing one or more images 180 of the product storage structure 115 at certain predetermined time intervals (e.g., every 1 second, 5 seconds, 10 seconds, etc.). The images 180 captured by the image capture device 120 may be transmitted to the electronic database 140 for storage and/or to the computing device 150 for processing by the control circuit 310 and/or to a web-/cloud-based image processing service 170.

In some aspects, the control circuit 310 of the computing device 150 obtains (e.g., from the electronic database 140, or from an image-processing internet-based service 170, or directly from the image capture device 120) one or more raw or processed images 180 of the product storage area 110 captured by the image capture device 120 while moving about the product storage area 110. In particular, in some aspects, the control circuit 310 of the computing device 150 is programmed to process a raw image 180 (captured by the image capture device 120 and obtained by the computing device 150 from the electronic database 140 or from the image capture device 120) to extract the raw image data and meta data from the image. In some aspects, the image 180 captured by the image capture device 120 may be processed via web-/cloud-based image processing service 170, which may be installed on the computing device 150 (or communicatively coupled to the computing device 150) and executed by the control circuit 310.

In some embodiments, the meta data extracted from the image 180 captured by the image capture device 120, when processed by the control circuit 310 of the computing device 150, enables the control circuit 310 of the computing device 150 to detect the physical location of the portion of the product storage area 110 and/or product storage structure 115 depicted in the image 180 and/or the physical locations and characteristics (e.g., size, shape, etc.) of the individual products 190 and the price tag labels 192 depicted in the image 180.

With reference to FIGS. 4 and 5, in some aspects, the control circuit 310 of the computing device 150 is configured to process the data extracted from the image 180 captured by the image capture device 120 to detect the overall size and shape of each of the individual products 190 located on the product storage structure 115 captured in the image 180. In some embodiments, the control circuit 310 is configured to process the data extracted from the image 180 and detect each of the individual products 190 and the price tag label 192 in the image 180 by executing one or more machine learning and/or computer vision modules and/or trained neural network modules/models 322. In certain aspects, the neural network executed by the control circuit 310 may be a deep convolutional neural network. The neural network module/model 322 may be trained using various data sets, including, but not limited to: raw image data extracted from the images 180 captured by the image capture device 120; meta data extracted from the images 180 captured by the image capture device 120; reference image data associated with reference images of various product storage structures 115 at the product storage facility 105; reference model cropped images 186 of various products 190 stocked and/or sold at the product storage facility 105; image histogram templates associated with the reference model cropped images 186, feature vector templates associated with the reference model cropped images 186, location information templates associated with the reference model cropped images 186, reference model cropped images of various price tag labels 192 applied to the product storage structures 115 at the product storage facility 105; planogram data associated with the product storage facility 105.

In some embodiments, the control circuit 310 may be trained to process one or more images 180 of product storage areas 110 at the product storage facility 105 to detect and/or recognize one or more products 190 using one or more computer vision/machine learning algorithms, including but not limited to Linear Regression, Logistic Regression, Decision Tree, SVM, Naïve Bayes, kNN, K-Means, Random Forest, Dimensionality Reduction Algorithms, and Gradient Boosting Algorithms. In some embodiments, the trained machine learning/neural network module/model 322 includes a computer program code stored in a memory 320 and/or executed by the control circuit 310 to process one or more images 180, as described herein. It will be appreciated that, in some embodiments, the control circuit 310 does not process the raw image 180 shown in FIG. 4 to result in the processed image 182 shown in FIG. 5, and that such processing is performed by an internet-based service 170, after which the processed image 182 is obtained by the control circuit 310 for further analysis.

In some aspects, the control circuit 310 is configured to process the data extracted from the image 180 via computer vision and one or more trained neural networks to detect each of the individual products 190 located on the product storage structure 115 in the image 180, and to generate virtual boundary lines 195 (as seen in image 182 in FIG. 5) around each one of the individual products 190 detected in the image 180. By the same token, in some aspects, the control circuit 310 is configured to process the data extracted from the image 180 via computer vision and one or more trained neural networks to detect the price tag label 192 located on the product storage structure 115 in the image 180, and to generate a virtual boundary line 199 (as seen in image 182 in FIG. 5) around the price tag label 192 detected in the image 180.

As seen in the image 182 in FIG. 5, the virtual boundary lines 195 extend about the outer edges of each of the individual products 190 located on the product storage structure 115, and form a perimeter around each of the individual products 190. Similarly, the virtual boundary lines 199 extend about the outer edges of the individual price tag label 192 located on the product storage structure 115, and form a perimeter around the price tag label 192. Generally, the control circuit 310 is programmed to interpret each of the virtual boundary lines 195 as surrounding only one individual product 190, to interpret the virtual boundary line 199 as surrounding only one individual price tag label 192.

In some embodiments, after generating the virtual boundary lines 195 around the products 190 and the virtual boundary lines 199 around the price tag label 192, the control circuit 310 of the computing device 150 is programmed to cause the computing device 150 to transmit a signal including the processed image 182 over the network 130 to the electronic database 140 for storage. In one aspect, this image 182 may be used by the control circuit 310 in subsequent image detection operations and/or training or retraining a neural network model as a reference model of a visual representation of the product storage structure 115 and/or products 190 and/or price tag labels 192. More specifically, in some implementations, the control circuit 310 is programmed to perform object detection analysis with respect to images subsequently captured by the image capture device 120 by utilizing machine learning/computer vision modules/models 322 that may include one or more neural network models trained using the image data stored in the electronic database 140. Notably, in certain aspects, the machine learning/neural network modules/models 322 may be retrained based on physical inspection of the product storage structure 115 and/or products 190 and/or price tag label 192 by a worker of the product storage facility 105, and in response to an input received from an electronic user device 160 of the worker.

In some embodiments, after the control circuit 310 processes the image 180 by the control circuit 310 of the computing device 150 to detect the individual products 190 within the image 180 and to generate virtual boundary lines 195 around each of the individual products 190, the control circuit 310 is programmed to further processes the image 182 to crop each individual product 190 from the image 182, thereby resulting in the cropped image 186 shown in FIG. 6. It will be appreciated that processing the image 182 to crop each individual product 190 from the image 182 and create the cropped image 186 is one example of the image processing that may be performed by the control circuit 310, and that, in some embodiments, instead of cropping out an image 186 of the product 190 from the image 182, the control circuit may copy/record the pixel data corresponding to the product 190 in the image 182, and just use the pixel data associated with the product 190 instead of using the cropped image 186 depicting the product 190. Then, the control circuit 310 further processes the cropped image 186 depicting the product 190 (or pixel data representing the product 190) as discussed in more detail below to create a reference model image that is stored in the electronic database 140 to facilitate recognition/identification of products 190 subsequently captured on the product storage structure 115 by the image capture device 120.

In some embodiments, the control circuit 310 processes the individual product 190 in the cropped image 186 (e.g., via optical character recognition (OCR)) to facilitate a recognition/identification of the product 190 in the cropped image 186. For example, the data extracted from the product 190 as a result of the OCR processing may include alphanumeric characters, such as name 185 of the product 190 (e.g., "CEREAL BRAND") and a non-alphanumeric image 184 of the product 190 (e.g., a bowl with cereal in it, etc.). In some embodiments, if the control circuit 310 is unable to perform OCR processing of the product 190 in the cropped image 186 (e.g., because the product 190 in the cropped image 186 is partially occluded), the control circuit 310 is programmed to generate an alert indicating that OCR processing of the product 190 in the cropped image 186 was not successful.

In some embodiments, after the control circuit 310 extracts the meta data (e.g., via OCR) from the exterior of the product 190 (or from the exterior of the packaging of the product 190) and detects a keyword in the extracted meta data, the control circuit 310 converts the detected keyword to a keyword instance that indicates the keyword (i.e., each letter or number or character of the keyword) and the location of the keyword on the product 190. For example, in the exemplary cropped image 186 of FIG. 6, the control circuit 310 detected the keyword "CEREAL BRAND" 185 (which indicates the brand name of the cereal product) on the product 190 and generated a virtual bounding box 191 around the detected product brand name 185 on the product 190. By the same token, the control circuit 310 detected the non-alphanumeric graphical object 184 (i.e., an image of a bowl with cereal in it) on the product 190 and generated a virtual bounding box 194 around the detected graphical object 184 on the product 190.

Figure 7:
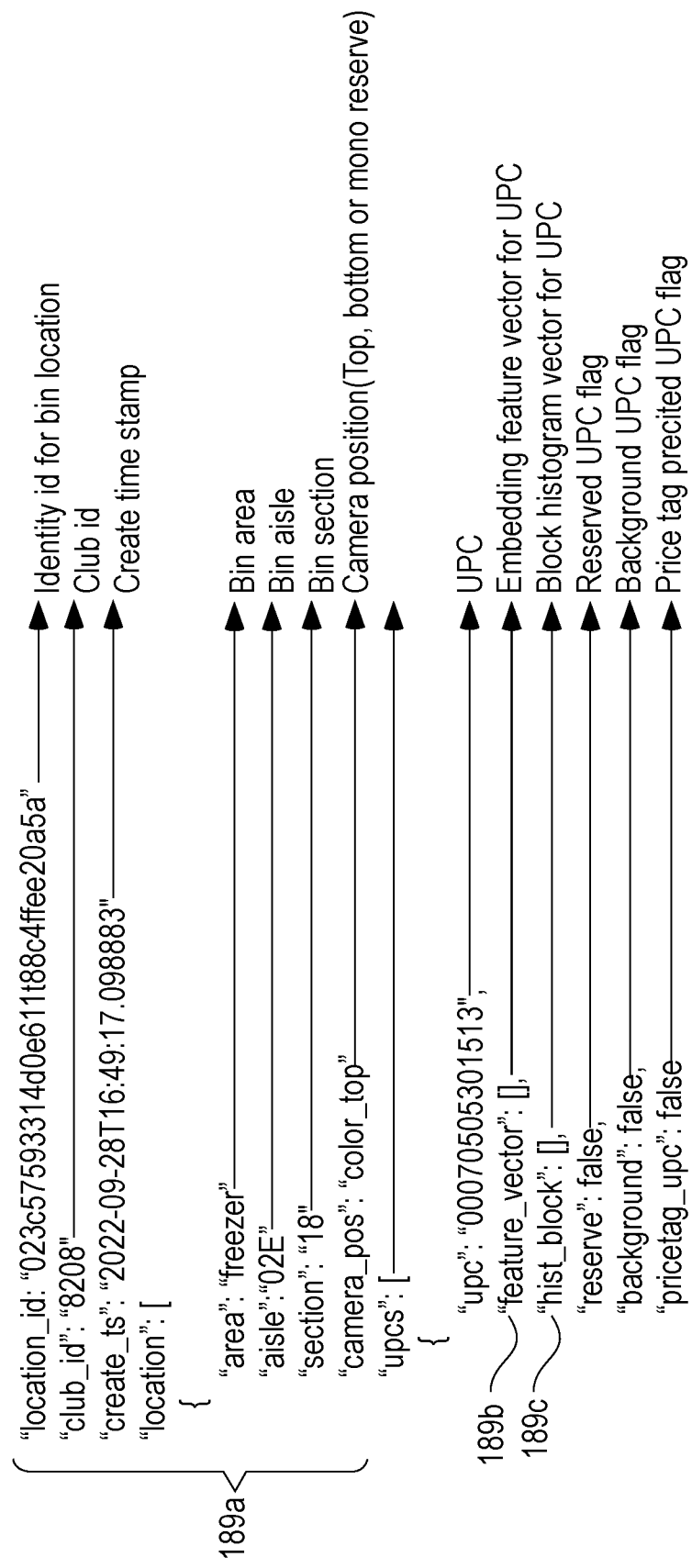
FIG. 7 is a diagram of an exemplary data set representing a searchable metadata schema (e.g., histogram template, feature vector template, and location information template) generated for the cropped image of FIG. 6 in accordance with some embodiments.

In some embodiments, after the keywords/images on the product 190 in the cropped image 186 are detected and the product 190 is identified, the control circuit 310 saves the cropped image 186 as a reference model image of the identified product 190, and generates a searchable historical data schema 188 in association with the cropped image 186 (see FIG. 7). This schema 188 includes various components and is stored in the electronic database 140 to facilitate efficient recognition/identification of the products 190 subsequently captured on the product storage structure 115 by the image capture device 120. The exemplary schema 188 illustrated in FIG. 7 includes a location information template 189*a* associated with the product 190 in the cropped image 186, a feature vector template 189*b* associated with the product 190 in the cropped image 186, and an image histogram template 189*c* associated with the product 190 in the cropped image 186. In some aspects, the generated historical data schema 188 is associated with the cropped image 186 such that the cropped image 186 and its associated historical data schema 188 are stored in the electronic database 140, representing a reference model for the product 190 in the cropped image 186, thereby facilitating identification of the product 190 subsequently captured on the product storage structure 115 of the product storage facility 105 by the image capture device 120.

With reference to FIG. 7, the exemplary location information template 189*a* generated by the control circuit 310 in association with a product 190 in the cropped image 186 may include but is not limited to the following electronic data: "location id" (which represents the physical location of the product 190 at the product storage facility 105); "club id" (which represents the unique identification number of the product storage facility 105); "create ts" (which represents the time stamp created when the image 180 was captured by the image capture device 120; "area" (which represents the named area (e.g., freezer) of the product storage facility 105 where the storage bin containing the product 190 in the image 180 is stored); "aisle" (which represents the identifier of the aisle (e.g., 02E) of the product storage facility 105 where the storage bin containing the product 190 in the image 180 is stored); "section" (which represents the identifier (e.g., 18) of the section of the product storage facility 105 where the storage bin containing the product 190 in the image 180 is stored); and "camera pos" (which represents the position (e.g., top, bottom, or mono reserve) of the image capture device 120 relative to the product 190 when the image 180 is captured by the image capture device 120.

The exemplary schema 188 shown in FIG. 7 further includes a feature vector template 189*b* associated with the cropped image 186 and a block histogram template 189*c* associated with the cropped image 186. Additionally, exemplary schema 188 shown in FIG. 7 further includes Universal Product Code (UPC)-associated data entries, including but not limited to: "upc" (which represents the UPC number of the product 190 identified in the cropped image 186; "reserve" (which represents the reserved UPC flag); "background" (which represents the background UPC flag); and "pricetag upc" (which represents the price tag precited UPC flag).

With reference to FIG. 8A, an exemplary method 800 of generating feature vector template 189*b* for the cropped image 186 includes obtaining the cropped image 186 (step 810), analyzing the cropped image 186 via a trained feature vector neural network 196 (step 820), and generating 1*128 dimension embedding feature vectors to establish a feature vector template 189*b* for the cropped image 186 (step 830). This feature vector template 189*b* then becomes a part of the historical schema 188 that is stored in the electronic database 140 in association with the reference model cropped image 186 depicting the identified product 190.

With reference to FIG. 8B, an exemplary method 805 of generating a block histogram template 189*c* for the cropped image 186 includes obtaining the cropped image 186 (step 815), separating the cropped image 186 into smaller image blocks, in this exemplary case, six image blocks 186*a*, 186*b*, 186*c*, 186*d*, 186*e*, and 186*f* (step 825), randomly reshuffling the smaller image blocks 186*a*-186*f* (step 835), calculating a block histogram for each of the smaller image blocks 186*a*-186*f*, in this exemplary case, six block histograms 187*a*, 187*b*, 187*c*, 187*d*, 187*e*, and 187*f* (step 845), and generating 1*128 dimension embedding vectors for each of the smaller image blocks 186*a*-186*f* to establish the block histogram template 189 for the cropped image 186 (step 855). This block histogram template 189*c* then becomes a part of the historical schema 188 that is stored in the electronic database 140 in association with the reference model cropped image 186 depicting the identified product 190.

FIG. 9 shows an exemplary flow of a process 900 of using the cached (i.e., electronic database 140-stored) reference model cropped images 186 for the previously identified products 190 having historical schemas 188 associated therewith to facilitate recognition/identification of products 990*a*, 990*b* that are captured subsequently (e.g., next day, next week, etc.) on the product storage structure 115 of the product storage facility 105 by the image capture device 120. In particular, the method 900 of FIG. 9 includes obtaining one or more (in this exemplary case two) cropped images 986*a* and 986*b*, which were derived from images akin to the image 180 of FIG. 4 captured by the image capture device 120, which were then processed to detect and crop out the individual products 990*a* and 990*b* as discussed above to result in the cropped images 986*a* and 986*b* of the products 990*a* and 990*b*, respectively (step 910).

The exemplary method 900 of FIG. 9 includes the control circuit 310 of the computing device 150 comparing the individual products 990*a*, 990*b* detected in the new cropped images 986*a*, 986*b* to the cropped images 186 having historical schemas 188 associated therewith and stored in the electronic database 140 as representations of the reference models for the previously-identified individual products 190 (step 920). In the example provided in FIG. 9, the control circuit 310 performed a comparison of the candidate cropped images 986*a* and 986*b* to the cached reference model cropped images 186 stored in the electronic database using the feature vector template 189*b* (stored in the electronic database 140 an indicating the texture information associated with the products 190 depicted in the reference model cropped images 186), and identified three reference model cropped images 986*c*, 986*d*, and 986*e* as depicting the products that appear most similar to the products 990*a* and 990*b* in the candidate cropped images 986*a* and 986*b*. In the example illustrated in FIG. 9, the reference model cropped image 986*c* selected by the control circuit 310 happens to depict a product 990*a* that matches the product 990*a* depicted in the first candidate cropped image 986*a*, the reference model cropped image 986*d* selected by the control circuit 310 happens to depict a product 990*b* that matches the product 990*b* that is depicted in the second candidate cropped image 986*b*, while the reference model cropped image 986*e* selected by the control circuit 310 happens to depict a product 990*c* that is not depicted in the first candidate cropped image 986*a* or in the second candidate cropped image 986*b*.

In the embodiment illustrated in FIG. 9, the method 900 further includes assigning a similarity ranking 997 to each of the reference model cropped images 986*c*-986*e* in comparison to the first candidate cropped image 986a (step 930). In some aspects, the control circuit 310 is programmed to perform this similarity ranking generation/assignment by utilizing the location information template 189a without going through the time-intensive OCR components (which would increase the processing time). In the example in FIG. 9, the control circuit 310 assigned the highest similarity ranking 997a (i.e., 0.97) to the product 990a from the reference model cropped image 986c, assigned the second highest similarity ranking 997b (i.e., 0.86) to the product 990b from the reference model cropped image 986d, and assigned the third highest similarity ranking 997c (i.e., 0.61) to the product 990c from the reference model cropped image 986d.

After assigning the respective similarity rankings 997a-997c to each of the cropped images 986c-986e in comparison to the first candidate cropped image 986a, the method 900 further includes assigning similarity rankings 997 to each of the cropped images 986c-986e in comparison to the second candidate cropped image 986b (step 940). As mentioned above, the control circuit 310 is programmed to perform this similarity ranking by utilizing the location information template 189a without going through the time-intensive OCR components (which would increase the processing time). In the example shown in FIG. 9, the control circuit 310 assigned the highest similarity ranking 997d (i.e., 0.94) to the product 990a from the reference model cropped image 986c, assigned the second highest similarity ranking 997e (i.e., 0.93) to the product 990b from the reference model cropped image 986d, and assigned the third highest similarity ranking 997f (i.e., 0.89) to the product 990c from the reference model cropped image 986e.

In some embodiments, the control circuit 310 is programmed to use the location information templates 189a stored in the electronic database 140 to correlate a location of the image capture device 120 when the image capture device 120 captures a new image (based on which the candidate cropped images 986a-986b are generated) to the location of the image capture device 120 when the image capture device 120 captured the images 180 (based on which the reference model cropped images 986c-986e) were generated. This correlation permits the control circuit 310 to determine product matches and product mismatches in certain situations.

For example, if the location information associated with the candidate cropped image 986a indicates that the original image 180 captured by the image capture device 120 was snapped in the cereal aisle of the product storage facility 105, and the location information template 189a associated with the reference model cropped image 986c indicates that the original image captured by the image capture device 120 was also snapped in the cereal aisle, then the control circuit 310 would favor interpreting the cropped images 986a and 986c as depicting matching products. On the other hand, if the location information associated with the candidate cropped image 986a indicates that the original image captured by the image capture device 120 was snapped in the cereal section and the location information template 189a associated with the reference model cropped image 986d indicates that the original image captured by the image capture device 120 was also snapped in the detergent aisle, then the control circuit 310 would favor interpreting the cropped images 986a and 986d as depicting products that do not match.

In the embodiment illustrated in FIG. 9, after determining a similarity ranking for each of the reference model cropped images 986c-986e in comparison to each of the candidate cropped images 986a and 986b as described above, the method 900 further includes employing the block histogram templates 189c associated with each of the reference model cropped images 986c-986e to perform a histogram verification to determine which of the reference model cropped images 986c-986e depict a product that has a matching exterior color distributions to the products 990a and 990b in the candidate cropped images 986a and 986b (step 950). In one aspect, step 950 may include the control circuit 310 generating an image histogram (i.e., 987a and 987b) for each of the candidate cropped images 986a and 986b, and comparing the image histograms 987a-987b of the candidate cropped images 986a-986b to the block histogram images 987c, 987d, and 987e obtained from the block histogram templates 189c associated with the reference model cropped images 986c-986e.

In the example illustrated in FIG. 9, the exemplary method 900 includes the control circuit 310 determining, based on the block histogram verification in step 950, that the reference model cropped image 986c depicts a product 990a that matches the exterior color distribution of the product 990a depicted in the candidate cropped image 986a, while the reference model cropped images 986d and 986e do not depict products that match the exterior color distribution of the product 990a depicted in the candidate cropped image 986a (step 960). As such, in the illustrated embodiment, the control circuit 310 determines that the reference model cropped image 986c is a match (by placing a check mark 989a next to it) to the reference model cropped image 986c, and identifies each of the reference model cropped images 986d and 986e as non-matches to the candidate cropped image 986a (by placing an X 989b next to the cropped image 986d and an X 989c next to the cropped image 986e). Then, the method 900 further includes the control circuit 310 generating a final result, indicating that the product 990a in the candidate cropped image 986a has been identified as a match for the product 990a in the reference model cropped image 986c (step 970).

By the same token, the exemplary method 900 includes the control circuit 310 determining, based on the block histogram verification in step 950, that the reference model cropped image 986d depicts a product 990b that matches the exterior color distribution of the product 990b depicted in the candidate cropped image 986b, while the reference model cropped images 986c and 986e do not depict products that match the exterior color distribution of the product 990b depicted in the candidate cropped image 986b (step 980). As such, in the illustrated embodiment, the control circuit 310 determines that the reference model cropped image 986d is a match (by placing a check mark 989e next to it) to the candidate cropped image 986d, and identifies each of the reference model cropped images 986c and 986e as non-matches to the candidate cropped image 986b (by placing an X 989d next to the cropped image 986e and an X 989f next to the cropped image 986c). Then, the method 900 further includes the control circuit 310 generating a final result, indicating that the product 990b in the candidate cropped image 986b has been identified as a match for the product 990b in the reference model cropped image 986d (step 985).

Figure 10:
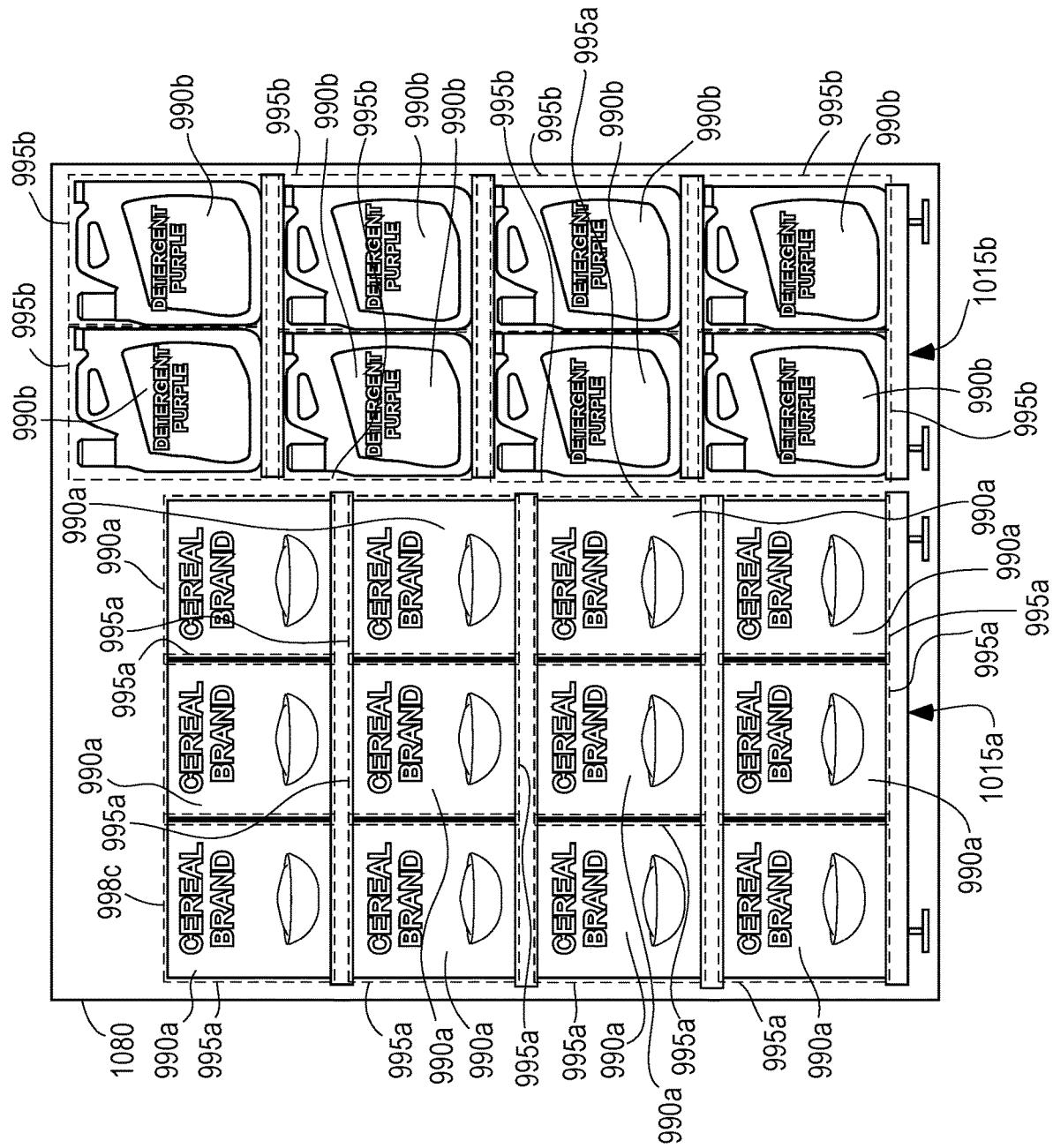
FIG. 10 is a diagram of an exemplary image taken by the image capture device at the product storage facility and depicting a portion of two adjacent product storage structures from which image the new candidate images were cropped, the image showing a total count of each of the individual products stored on each of the adjacent product storage structures.

FIG. 10 depicts an exemplary image 1080 that is akin to the image 180 snapped by the image capture device 120 during the movement of the image capture device 120 through the product storage facility 105. A difference between the image 180 of FIG. 4 and the image 1080 of FIG. 10 is that, while the image 180 of FIG. 4 shows one product storage structure 115 that stores 16 identical units of the product 190 thereon, the image 1080 of FIG. 10 shows portions of two adjacent product storage structures 1015*a* and 1015*b*, with the product storage structure 1015*a* storing 12 units of the product 990*a* thereon, and the product storage structure 1015*b* storing 8 units of the product 990*b* thereon.

In some embodiments, after the products 990*a* and 990*b* in the candidate cropped images 986*a*-986*b* (which are cropped from the image 1080 of FIG. 10) are identified in the steps 980 and 990 of the above-described method 900, the control circuit 310 is programmed to process the image 1080 to specifically identify each of the objects (i.e., products) detected on the product storage structures 1015*a*-1015*b* in the image 1080. In particular, in the illustrated embodiment, the control circuit 310 is programmed to process the image 1080 by annotating the image 1080 to include a virtual boundary line 995*a* around each of the identified products 990*a* (i.e., all 12 of them), and a virtual boundary line 995*b* around each of the identified products 990*b* (i.e., all 8 of them), thereby generating an on-hand count for each of the products 990*a* and 990*b* detected on the product storage structures 1015*a* and 1015*b* of the product storage facility 105.

In some aspects, the control circuit 310 may process the image 1080 by including an indication of the product identifier (e.g., the full UPC number or the last 3 or 4 digits of the UPC) associated with each of the identified products 990*a* and 990*b* detected in the image 1080, such that the indication of the UPC of each individual product 990*a* or 990*b* is located within the perimeter of a respective virtual boundary line 195*a* or 195*b* associated with the individual products 990*a* and 990*b*. In some aspects, the control circuit is programmed to transmit a signal including updated counts of the products 190 on the product storage structures 115 of the product storage facility 105 to the electronic database 140, thereby updating the electronic database 140 to include the most up to date counts of the on-hand products 190 at the product storage facility 105.

With reference to FIG. 11, an exemplary method 1100 of operation of the system 100 for detecting and recognizing products 190 at product storage areas 110 of a product storage facility 105 is described. The method 1100 includes capturing one or more images 180 of the product storage structure 115 by an image capture device 120 having a field of view that includes the product storage structure 115, which has products 190 and price tag labels 192 arranged thereon (step 1110). In some embodiments, the image capture device 120 moves about the product storage facility 105 (while being controlled remotely by the computing device 150 (or another remote device such one or more user devices 160)), or while being controlled autonomously by the control circuit 206 of the image capture device 120), or while being manually driven or pushed by a worker of the product storage facility 105.

When the image capture device 120 moves about the product storage area 110 as shown in FIG. 1, the sensor 214 of the image capture device 120, which may be one or more digital cameras, captures (in sequence and at predetermined intervals) multiple images of the product storage area 110 and the product storage structure 115 from various angles. As pointed out above, the image capture device 120 may move about the product storage area 110 while capturing images 180 of the product storage structure 115 at predetermined time intervals (e.g., every 1 second, 5 seconds, 10 seconds, etc.), and the images 180 captured by the image capture device 120 may be transmitted to an electronic database 140 for storage and/or to the computing device 150 for processing by the control circuit 310 and/or to a web-/cloud-based image processing service 170.

As pointed out above, the electronic database 140 of FIG. 1 may be configured as a single database, or a collection of multiple communicatively connected databases (e.g., digital image database, meta data database, inventory database, pricing database, customer database, vendor database, manufacturer database, etc.) and is configured to store various raw and processed images (e.g., 180, 182, 186) of the product storage area 110 and product storage structure 115 (and price tag labels 192 and products 190 located thereon) captured by the image capture device 120 while the image capture device 120 is moving about the product storage facility 105.

In some aspects, the electronic database 140 may store the raw images 180 of the product storage structure 115, the processed images 182 of the product storage structure 115 that include virtual boundary lines 195 around the products 190 and virtual boundary line 199 around the price tag label 192, the cropped images 186 of the individual products 190, one or more of which may be retrieved from the electronic database 140 by the control circuit 310 of the computing device 150 and/or by the internet-based services 170 and used in subsequent operations involving image processing and object detection and/or training a neural network model as a reference model of a visual representation of the product storage structure 115 and/or products 190. As pointed out above, in some implementations, the electronic database 140 stores the cropped images 186 of the products 190 that have been identified, together with electronic data representing a searchable historical schema 188 (e.g., location information template 189*a*, feature vector template 189*b*, block histogram template 189*c*, etc.), as representations of reference model cropped images that facilitate recognition/identification of products 190 subsequently captured on the product storage structure 115 by the image capture device 120.

The exemplary method 1100 of FIG. 11 further includes several actions performed by a computing device 150 including a control circuit 310 and communicatively coupled to the image capture device 120. In particular, the method 1100 includes obtaining at least one image 180 of the product storage structure 115 captured by the image capture device 120 (step 1120). As pointed out above, the computing device 150 may obtain the image 180 directly from the image capture device 120 (e.g., over the network 130 via the wireless transceiver 212 of the image capture device and the input/output 340 of the computing device 150), or from the electronic database 140 (e.g., over the network 130 via the input/output 340 of the computing device over the network 130), or from an internet-based service 170 (which may process the image 180 as described above to result in the image 182 and/or processes the image 182 to result in the cropped image 186 of the product 190, such that, in step 1120, the computing device 150 does not obtain the raw image 180, but obtains the processed image 182 and/or 186).

In the illustrated embodiment, after the control circuit 310 obtains the image 180, the method 1100 further includes the control circuit 310 of the computing device 150 analyzing the image 180 of the product storage structure 115 captured by the image capture device 120 to detect individual ones of price tag labels 192 located on the product storage structure 115 (step 1130), as well as analyzing the image 180 of the product storage structure 115 to detect individual ones of the products 190 located on the product storage structure 115 (step 1140). As pointed out above, in some embodiments, the control circuit 310 analyzes the images 180 to detect each of the individual products 190 located on the product storage structure 115 in the image 180, and to generate virtual boundary lines 195 (as seen in image 182 in FIG. 5) around each one of the individual products 190 detected in the image 180. Similarly, in some aspects, the control circuit 310 is configured to detect the price tag label 192 located on the product storage structure 115 in the image 180, and to generate a virtual boundary line 199 (as seen in image 182 in FIG. 5) around the price tag label 192 detected in the image 180.

In the illustrated embodiment, the exemplary method 1100 further includes, based on detection of the individual ones of the products 190 located on the product storage structure 115, and based on detection of the individual ones of the price tag labels 192 located on the product storage structure 115, identifying the individual products 190 in the captured image 180 (step 1150). As pointed out above, in some aspects, the identification of the individual products 190 may include processing the image 180 (captured by the image capture device 120 and obtained by the computing device 150 from the electronic database 140 or from the image capture device 120) to extract the raw image data and meta data from the image 180 and, more particularly, extracting one or more alphanumeric characters from the individual products 190 and price tag label 192. As pointed out above, the characters that may be extracted (e.g., by OCR processing) from the price tag label 192 in the image 182 may include the name of the product 190 (e.g., "CEREAL BRAND"), the price of the product 190 (e.g., $5.54), and the characters that may be extracted from the product 190 in the image 182 may include the name 185 of the product 190 (e.g., "CEREAL BRAND"), as well as the non-alphanumeric image 184 (e.g., a bowl) on the product 190.

With reference to FIG. 11, after the control circuit 310 identifies the individual products 190 in the processed image 182, the exemplary process flow 1100 includes the control circuit 310 cropping each of the individual identified individual products 190 from the image 182 to generate a plurality of cropped images 186 (see FIG. 6), each of the cropped images 186 representing a reference model for each of the identified individual products 190 (step 1160).

In the illustrated embodiment, after the product 190 is identified and the image 186 of the identified product 190 is cropped and saved in the electronic database 140 as a reference model for the identified product 190, the exemplary method 1100 further includes generating a searchable historical data schema 188 in association with the cropped image 186, and more particularly, generating a location information template 189a associated with the product 190 in the cropped image 186, a feature vector template 189b associated with the product 190 in the cropped image 186, and a image block histogram template 189c associated with the product 190 in the cropped image 186 (step 1170). The method 1100 further includes storing each of the cropped images 186 in association with its respective generated historical data schema 188 in the electronic database 140, representing a reference model for the product 190 in the cropped image 186, thereby facilitating identification of the product 190 subsequently captured on the product storage structure 115 of the product storage facility 105 by the image capture device 120 (step 1180).

The above-described embodiments advantageously provide for inventory management systems and methods, where the individual products detected on the product storage structures of a product storage facility can be efficiently detected and identified. As such, the systems and methods described herein provide for an efficient and precise identification of products on product storage structures of a product storage facility and provide a significant cost savings to the product storage facility by saving the product storage facility thousands of worker hours that would be normally spent on manual on-hand product availability monitoring.

This application is related to the following applications, each of which is incorporated herein by reference in its entirety: entitled SYSTEMS AND METHODS OF SELECTING AN IMAGE FROM A GROUP OF IMAGES OF A RETAIL PRODUCT STORAGE AREA filed on Oct. 11, 2022, application Ser. No. 17/963,787; entitled SYSTEMS AND METHODS OF IDENTIFYING INDIVIDUAL RETAIL PRODUCTS IN A PRODUCT STORAGE AREA BASED ON AN IMAGE OF THE PRODUCT STORAGE AREA filed on Oct. 11, 2022, application Ser. No. 17/963,802; entitled CLUSTERING OF ITEMS WITH HETEROGENEOUS DATA POINTS filed on Oct. 11, 2022, application Ser. No. 17/963,903; entitled SYSTEMS AND METHODS OF TRANSFORMING IMAGE DATA TO PRODUCT STORAGE FACILITY LOCATION INFORMATION filed on Oct. 11, 2022, application Ser. No. 17/963,751; entitled SYSTEMS AND METHODS OF MAPPING AN INTERIOR SPACE OF A PRODUCT STORAGE FACILITY filed on Oct. 14, 2022, application Ser. No. 17/966,580; entitled SYSTEMS AND METHODS OF DETECTING PRICE TAGS AND ASSOCIATING THE PRICE TAGS WITH PRODUCTS filed on Oct. 21, 2022, application Ser. No. 17/971,350; entitled SYSTEMS AND METHODS OF VERIFYING PRICE TAG LABEL-PRODUCT PAIRINGS filed on Nov. 9, 2022, application Ser. No. 17/983,773; entitled SYSTEMS AND METHODS FOR PROCESSING IMAGES CAPTURED AT A PRODUCT STORAGE FACULTY filed Jan. 24, 2023, application Ser. No. 18/158,925; and entitled SYSTEMS AND METHODS FOR PROCESSING IMAGES CAPTURED AT A PRODUCT STORAGE FACULTY filed Jan. 24, 2023, application Ser. No. 18/158,950.

Those skilled in the art will recognize that a wide variety of other modifications, alterations, and combinations can also be made with respect to the above-described embodiments without departing from the scope of the invention, and that such modifications, alterations, and combinations are to be viewed as being within the ambit of the inventive concept.

What is claimed is:

1. A system for detecting and recognizing products in product storage areas of a product storage facility, the system comprising:
  an image capture device having a field of view that includes at least a portion of a product storage structure located in a product storage area of the product storage facility, the product storage structure having products and price tag labels arranged thereon, wherein the image capture device is configured to capture one or more images of the product storage structure; and
  a computing device including a control circuit, the computing device being communicatively coupled to the image capture device, the control circuit being configured to:
    obtain at least one image of the product storage structure captured by the image capture device;
    analyze the at least one image of the product storage structure captured by the image capture device to detect at least one of individual ones of price tag labels located on the product storage structure and at least one of individual ones of the products located on the product storage structure;

recognize the individual products in the at least one image as corresponding to a known product identifier;

crop each of the recognized individual products from the at least one image to generate a plurality of cropped images, each of the cropped images representing a reference model for each of the recognized individual products;

generate an image histogram template, feature vector template and location information template for each of the cropped images; and store each of the cropped images representing the reference model for each of the recognized individual products in an electronic database in association with the generated image histogram template, feature vector template and location information template to facilitate recognition of the products subsequently captured on the product storage structure by the image capture device;

wherein the control circuit is programmed to generate the image histogram template for a cropped image by separating the cropped image into a plurality of blocks, randomly reshuffling the blocks and calculating a histogram for each of the randomly reshuffled blocks.

2. The system of claim 1, wherein the image capture device comprises a motorized robotic unit that includes wheels that permit the motorized robotic unit to move about the product storage facility, and a camera to permit the motorized robotic unit to capture the one or more images of the product storage structure.

3. The system of claim 1,
wherein the control circuit is programmed to generate a first set of virtual boundary lines in the at least one obtained image, wherein each of the virtual boundary lines of the first set surrounds an individual one of the products captured in the at least one obtained image; and wherein the control circuit is programmed to generate a second set of virtual boundary lines in the at least one obtained image, wherein each of the virtual boundary lines of the second set surrounds an individual one of the price tag labels captured in the at least one obtained image.

4. The system of claim 1, wherein the control circuit is programmed to:
obtain at least one new image of the product storage structure captured by the image capture device;

analyze the at least one new image of the product storage structure captured by the image capture device to detect an individual product located on the product storage structure;

compare the individual product detected in the at least one new image to the cropped images stored in the electronic database and representing the reference models for the recognized individual products;

based on detecting a match between the individual product detected in the at least one new image to one of the cropped images stored in the electronic database and representing the reference models for the recognized individual products, recognize the individual product detected in the at least one new image; and update the electronic database to include a count of a number of units of the recognized individual product detected in the at least one new image on the product storage structure.

5. The system of claim 4, wherein the control circuit is programmed, based on not detecting a match between the individual product detected in the at least one new image to one of the cropped images stored in the electronic database and representing the reference models for the recognized individual products, to update the electronic database to add the at least one new image as a reference model for the individual product detected in the at least one new image.

6. The system of claim 4, wherein the control circuit is programmed to:
analyze a similarity of the individual product detected in the at least one new image to the cropped images stored in the electronic database and representing the reference models for the recognized individual products; and generate a ranking of the cropped images stored in the electronic database and representing the reference models for the recognized individual products, wherein one of the cropped images stored in the electronic database and determined by the control circuit to depict a product that is most similar to the individual product detected in the at least one new image is ranked highest in the ranking.

7. The system of claim 4, wherein the control circuit is programmed to:
crop the individual product detected in the at least one new image from the at least one new image to create a candidate cropped image;

generate an image histogram for the candidate cropped image; and perform a comparison of the image histogram of the candidate cropped image to the image histogram template associated with the cropped images stored in the electronic database and representing the reference models for the recognized individual products in order to determine whether an exterior color of the individual product in the candidate cropped image matches an exterior color of the products in the cropped images stored in the electronic database and representing the reference models for the recognized individual products.

8. The system of claim 7, wherein the control circuit is programmed to correlate a location of the image capture device when the at least one new image of the product storage structure was captured to the location information templates associated in the electronic database with the cropped images stored in the electronic database and representing the reference models for the recognized individual products in order to determine whether a physical location of the individual product detected in the at least one new image and depicted in the candidate cropped image matches a physical location of any of the recognized individual products depicted in the cropped images stored in the electronic database.

9. The system of claim 7, wherein the control circuit is programmed to analyze the individual product detected in the at least one new image and depicted in the candidate cropped image to obtain feature vector information from the individual product, and to correlate the feature vector information obtained from the individual product in the candidate cropped image to the feature vector templates associated in the electronic database with the cropped images stored in the electronic database and representing the reference models for the recognized individual products in order to determine whether an exterior texture of the individual product detected in the at least one new image and depicted in the candidate cropped image matches an exterior texture of any of the recognized individual products depicted in the cropped images stored in the electronic database.

10. A method of detecting and recognizing products on product storage structures at a product storage facility, the method comprising:
- capturing, by an image capture device, one or more images of at least a portion of a product storage structure in a product storage area of the product storage facility, the product storage structure having products and price tag labels arranged thereon; and
- by a computing device including a control circuit and communicatively coupled to the image capture device:
  - obtaining at least one image of the product storage structure captured by the image capture device;
  - analyzing the at least one image of the product storage structure captured by the image capture device to detect at least one of individual ones of price tag labels located on the product storage structure and at least one of individual ones of the products located on the product storage structure;
  - recognizing the individual products in the at least one image as corresponding to a known product identifier;
  - cropping each of the recognized individual products from the at least one image to generate a plurality of cropped images, each of the cropped images representing a reference model for each of the recognized individual products;
  - generating an image histogram template, feature vector template and location information template for each of the cropped images; and
  - storing each of the cropped images representing the reference model for each of the recognized individual products in an electronic database in association with the generated image histogram template, feature vector template and location information template to facilitate recognition of the products subsequently captured on the product storage structure by the image capture device;
- wherein the generating the image histogram template further comprising generating the image histogram for a cropped image by separating the cropped image into a plurality of blocks, randomly reshuffling the blocks and calculating a histogram for each of the randomly reshuffled blocks.

11. The method of claim 10, further comprising, by the control circuit:
- generating a first set of virtual boundary lines in the at least one obtained image, wherein each of the virtual boundary lines of the first set surrounds an individual one of the products captured in the at least one obtained image; and
- generating a second set of virtual boundary lines in the at least one obtained image, wherein each of the virtual boundary lines of the second set surrounds an individual one of the price tag labels captured in the at least one obtained image.

12. The method of claim 10, further comprising, by the control circuit:
- obtaining at least one new image of the product storage structure captured by the image capture device;
- analyzing the at least one new image of the product storage structure captured by the image capture device to detect an individual product located on the product storage structure;
- comparing the individual product detected in the at least one new image to the cropped images stored in the electronic database and representing the reference models for the recognized individual products; based on detecting a match between the individual product detected in the at least one new image to one of the cropped images stored in the electronic database and representing the reference models for the recognized individual products, recognizing the individual product detected in the at least one new image; and
- updating the electronic database to include a count of a number of units of the recognized individual product detected in the at least one new image on the product storage structure.

13. The method of claim 12, further comprising, by the control circuit, based on not detecting a match between the individual product detected in the at least one new image to one of the cropped images stored in the electronic database and representing the reference models for the recognized individual products, to update the electronic database to add the at least one new image as a reference model for the individual product detected in the at least one new image.

14. The method of claim 12, further comprising, by the control circuit:
- analyzing a similarity of the individual product detected in the at least one new image to the cropped images stored in the electronic database and representing the reference models for the recognized individual products; and
- generating a ranking of the cropped images stored in the electronic database and representing the reference models for the recognized individual products, wherein one of the cropped images stored in the electronic database and determined by the control circuit to depict a product that is most similar to the individual product detected in the at least one new image is ranked highest in the ranking.

15. The method of claim 12, further comprising, by the control circuit:
- cropping the individual product detected in the at least one new image from the at least one new image to create a candidate cropped image;
- generating an image histogram for the candidate cropped image; and
- performing a comparison of the image histogram of the candidate cropped image to the image histogram template associated with the cropped images stored in the electronic database and representing the reference models for the recognized individual products in order to determine whether an exterior color of the individual product in the candidate cropped image matches an exterior color of the products in the cropped images stored in the electronic database and representing the reference models for the recognized individual products.

16. The method of claim 15, further comprising, by the control circuit, correlating a location of the image capture device when the at least one new image of the product storage structure was captured to the location information templates associated in the electronic database with the cropped images stored in the electronic database and representing the reference models for the recognized individual products in order to determine whether a physical location of the individual product detected in the at least one new image and depicted in the candidate cropped image matches a physical location of any of the recognized individual products depicted in the cropped images stored in the electronic database.

17. The method of claim 15, further comprising, by the control circuit, analyzing the individual product detected in the at least one new image and depicted in the candidate cropped image to obtain feature vector information from the individual product, and to correlate the feature vector information obtained from the individual product in the candidate cropped image to the feature vector templates associated in the electronic database with the cropped images stored in the electronic database and representing the reference models for the recognized individual products in order to determine whether an exterior texture of the individual product detected in the at least one new image and depicted in the candidate cropped image matches an exterior texture of any of the recognized individual products depicted in the cropped images stored in the electronic database.

\* \* \* \* \*